United States Patent
Kitajima

(10) Patent No.: US 8,983,204 B2
(45) Date of Patent: Mar. 17, 2015

(54) IMAGE PROCESSING APPARATUS AND METHOD FOR CONTROLLING SAME

(71) Applicant: Canon Kabushiki Kaisha, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 13/680,651

(22) Filed: Nov. 19, 2012

(65) Prior Publication Data

US 2013/0136367 A1    May 30, 2013

(30) Foreign Application Priority Data

Nov. 30, 2011   (JP) ................................. 2011-262657

(51) Int. Cl.
| | |
|---|---|
| G06K 9/48 | (2006.01) |
| G06K 9/46 | (2006.01) |
| G06T 5/00 | (2006.01) |
| G06T 7/00 | (2006.01) |

(52) U.S. Cl.
CPC .............. *G06K 9/4604* (2013.01); *G06T 5/003* (2013.01); *G06T 7/0085* (2013.01); *G06T 2207/10024* (2013.01); *G06T 2207/20021* (2013.01); *G06T 2207/20192* (2013.01)
USPC ............................. 382/199; 382/217; 382/266

(58) Field of Classification Search
CPC ............................. H04N 1/409; G06T 7/0083
USPC ................................................. 382/199, 217
See application file for complete search history.

(56) References Cited

U.S. PATENT DOCUMENTS

| | | | |
|---|---|---|---|
| 8,300,972 B2 * | 10/2012 | Hosaka et al. ................. | 382/255 |
| 8,472,715 B2 * | 6/2013 | Yokomitsu et al. ............ | 382/170 |
| 8,548,254 B2 * | 10/2013 | Ishikawa et al. .............. | 382/217 |
| 8,577,137 B2 * | 11/2013 | Aisaka et al. ................. | 382/165 |

| | | | |
|---|---|---|---|
| 2005/0069217 A1 | 3/2005 | Mukherjee | |
| 2013/0136367 A1 * | 5/2013 | Kitajima ....................... | 382/199 |

FOREIGN PATENT DOCUMENTS

| | | |
|---|---|---|
| CN | 101126813 A | 2/2008 |
| JP | 2000-059651 | 2/2000 |
| JP | 2002-190984 | 7/2002 |

OTHER PUBLICATIONS

The above patent documents in this IDS were cited in a Sep. 3, 2014 Chinese Office Action, which is enclosed with an English Translation, that issued in Chinese Patent Application No. 201210506503.7.
Hu Zheng-ping, Rong Yi, "Scene Classification Algorithm Based on EILBP Visual Descriptors and PLSA Statistical Model", Opto-Electronic Engineering, vol. 37, No. 11, Nov. 30, 2010.

* cited by examiner

*Primary Examiner* — Gregory M Desire
(74) *Attorney, Agent, or Firm* — Cowan, Liebowitz & Latman, P.C.

(57) ABSTRACT

A production unit of an image processing apparatus produces a contour signal of an image including a specific subject. A detection unit detects, on the basis of the contour signal, a representative contour direction for each of a plurality of division regions of the image, where the detection unit detects a specific direction as the representative contour direction when the direction of the entire contour portion included in the division regions is biased in the specific direction by at least a specific degree. A determination unit determines a type of the subject on the basis of at least one of a direction-based frequency distribution of the detected representative contour directions, a number of representative contour directions detected, etc. A correction unit configured to correct the image data according to a correction method corresponding to the type of the subject.

10 Claims, 18 Drawing Sheets

FIG. 4A

| f(i−1, j−1) | f(i, j−1) | f(i+1, j−1) |
|---|---|---|
| f(i−1, j) | f(i, j) | f(i+1, j) |
| f(i−1, j+1) | f(i, j+1) | f(i+1, j+1) |

INPUT SIGNAL

FIG. 4B

| a(−1,−1) | a(0,−1) | a(1,−1) |
|---|---|---|
| a(−1,0) | a(0,0) | a(1,0) |
| a(−1,1) | a(0,1) | a(1,1) |

FILTER

FIG. 4C

| 1 | 2 | 1 |
|---|---|---|
| 0 | 0 | 0 |
| −1 | −2 | −1 |

VERTICAL BPF

FIG. 4D

| −1 | 0 | 1 |
|---|---|---|
| −2 | 0 | 2 |
| −1 | 0 | 1 |

HORIZONTAL BPF

FIG. 4E

| 0 | 1 | 2 |
|---|---|---|
| −1 | 0 | 1 |
| −2 | −1 | 0 |

UPPER-RIGHT BPF

FIG. 4F

| −2 | −1 | 0 |
|---|---|---|
| −1 | 0 | 1 |
| 0 | 1 | 2 |

LOWER-RIGHT BPF

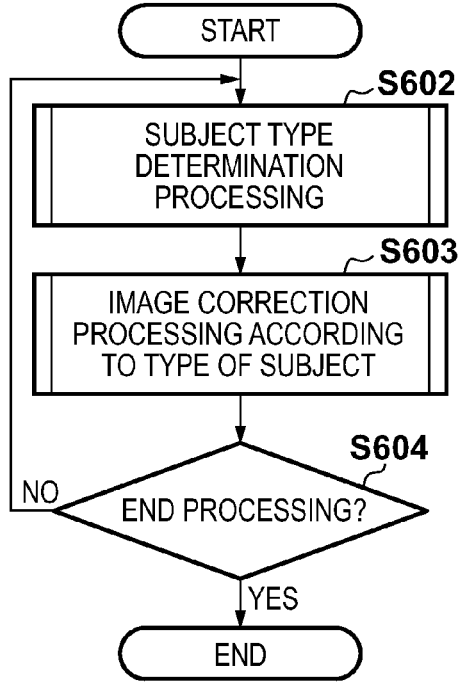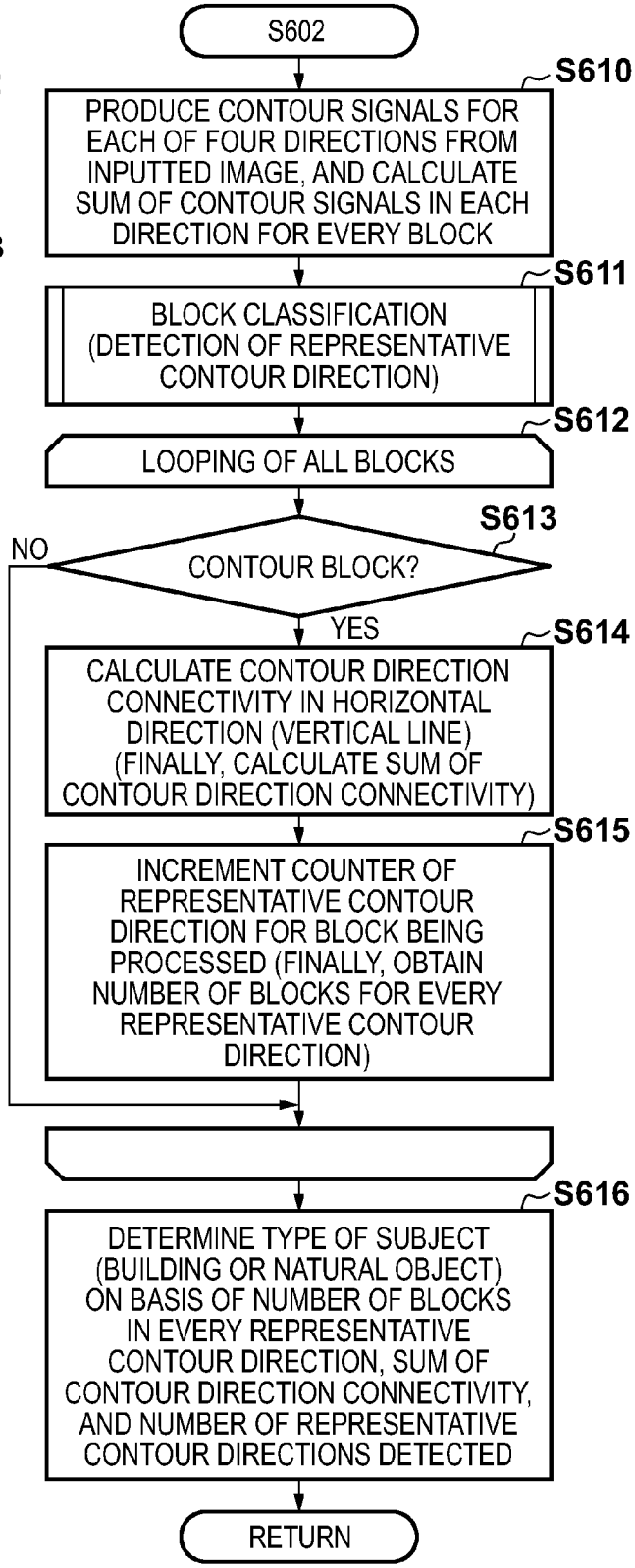

FIG. 9A
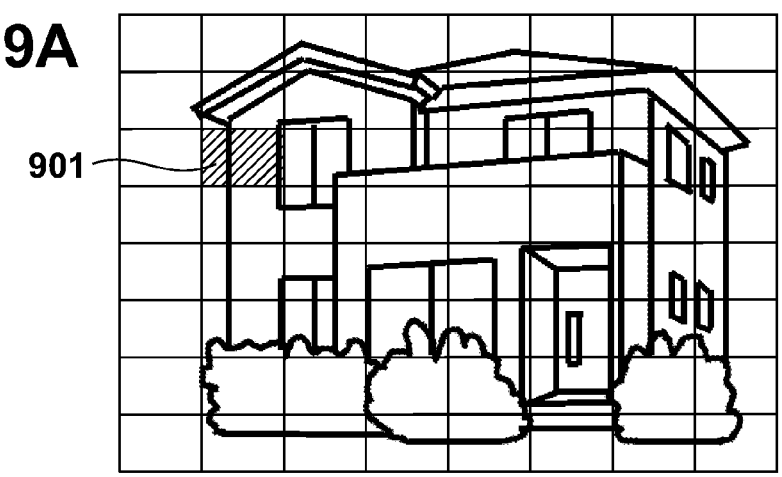
FIG. 9B
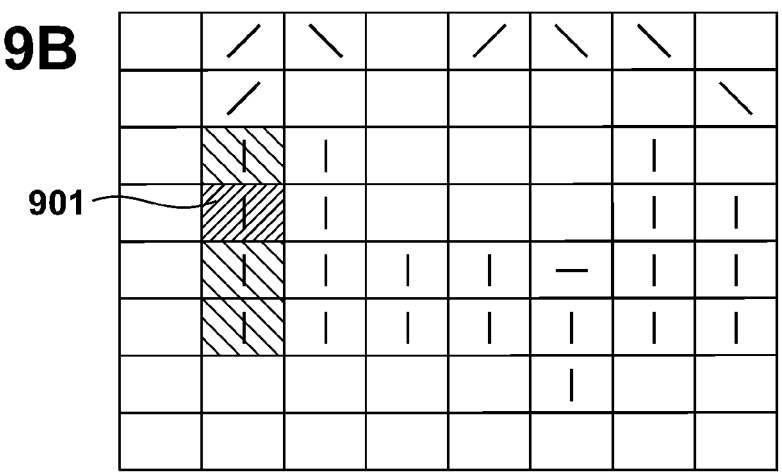
FIG. 9C

FIG. 11A

| TYPE OF SUBJECT | CONTOUR ENHANCEMENT PROCESSING | NOISE REDUCTION PROCESSING |
|---|---|---|
| BUILDING | • SET CENTER FREQUENCY OF CONTOUR DETECTION BETWEEN LOW AND MEDIUM<br>• EXPAND CORING RANGE<br>• SET GAIN STRONGER | INCREASE $\varepsilon$ VALUE |
| NATURAL OBJECT | • SET CENTER FREQUENCY OF CONTOUR DETECTION BETWEEN MEDIUM AND HIGH<br>• NARROW CORING RANGE<br>• SET GAIN WEAKER | DECREASE $\varepsilon$ VALUE |

FIG. 11B

| TYPE OF SUBJECT | TYPE OF SUBJECT IN GROUP | CONTOUR ENHANCEMENT PROCESSING | NOISE REDUCTION PROCESSING |
|---|---|---|---|
| BUILDING | FLAT BUILDING REGION | • SET CENTER FREQUENCY OF CONTOUR DETECTION BETWEEN LOW AND MEDIUM<br>• EXPAND CORING RANGE<br>• SET GAIN STRONGER | INCREASE $\varepsilon$ VALUE |
| BUILDING | COMPLEX BUILDING REGION | • SET CENTER FREQUENCY OF CONTOUR DETECTION BETWEEN LOW AND MEDIUM<br>• NARROW CORING RANGE<br>• SET GAIN INTERMEDIATE | DECREASE $\varepsilon$ VALUE |
| BUILDING | NON-BUILDING REGION | • SET CENTER FREQUENCY OF CONTOUR DETECTION BETWEEN MEDIUM AND HIGH<br>• NARROW CORING RANGE<br>• SET GAIN WEAKER | DECREASE $\varepsilon$ VALUE |
| NATURAL OBJECT | | | |

FIG. 13A
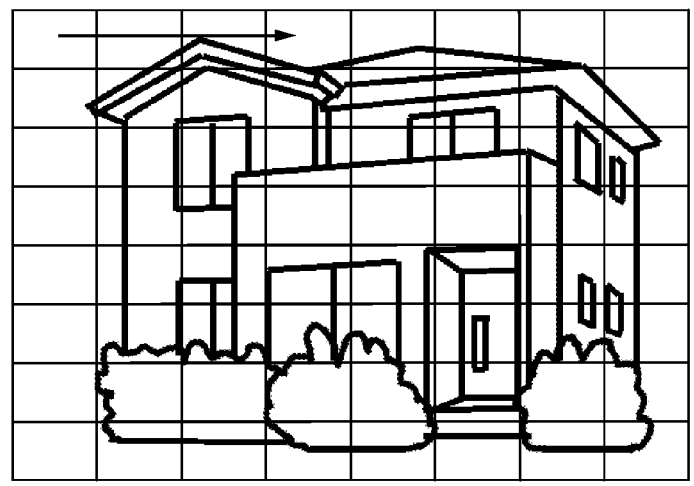
FIG. 13B
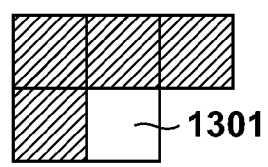
FIG. 13C
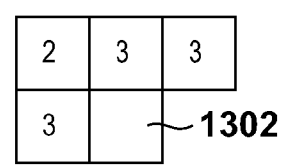
FIG. 13D

1501a — HORIZONTAL CONTOUR
(VERTICAL LINE)

UPPER-RIGHT CONTOUR — 1502a

VERTICAL CONTOUR
(HORIZONTAL LINE) — 1503a

LOWER-RIGHT CONTOUR — 1504a

1501b — LOWER-RIGHT CONTOUR

HORIZONTAL CONTOUR — 1502b
(VERTICAL LINE)

UPPER-RIGHT CONTOUR — 1503b

VERTICAL CONTOUR — 1504b
(HORIZONTAL LINE)

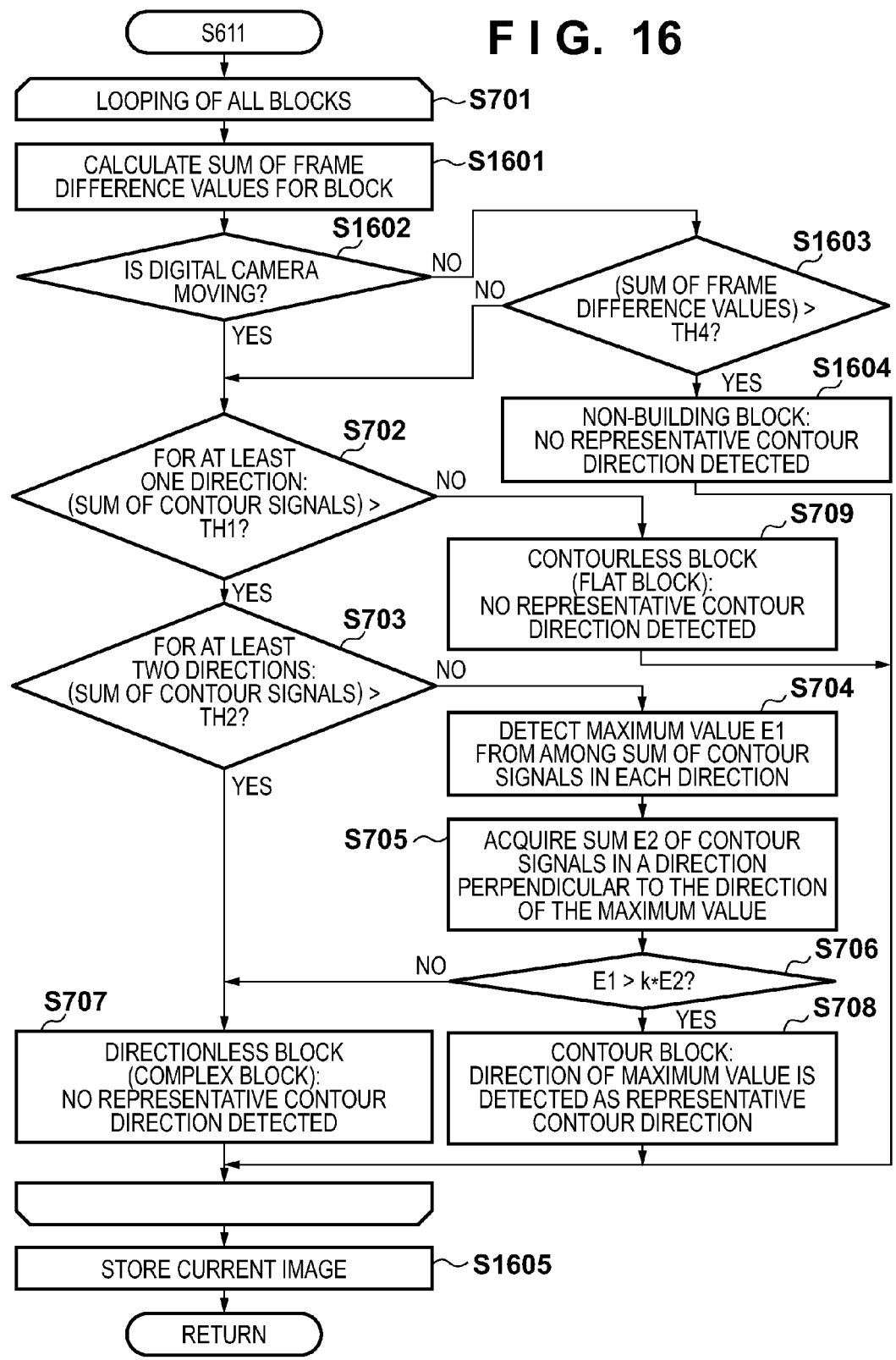
F I G. 16

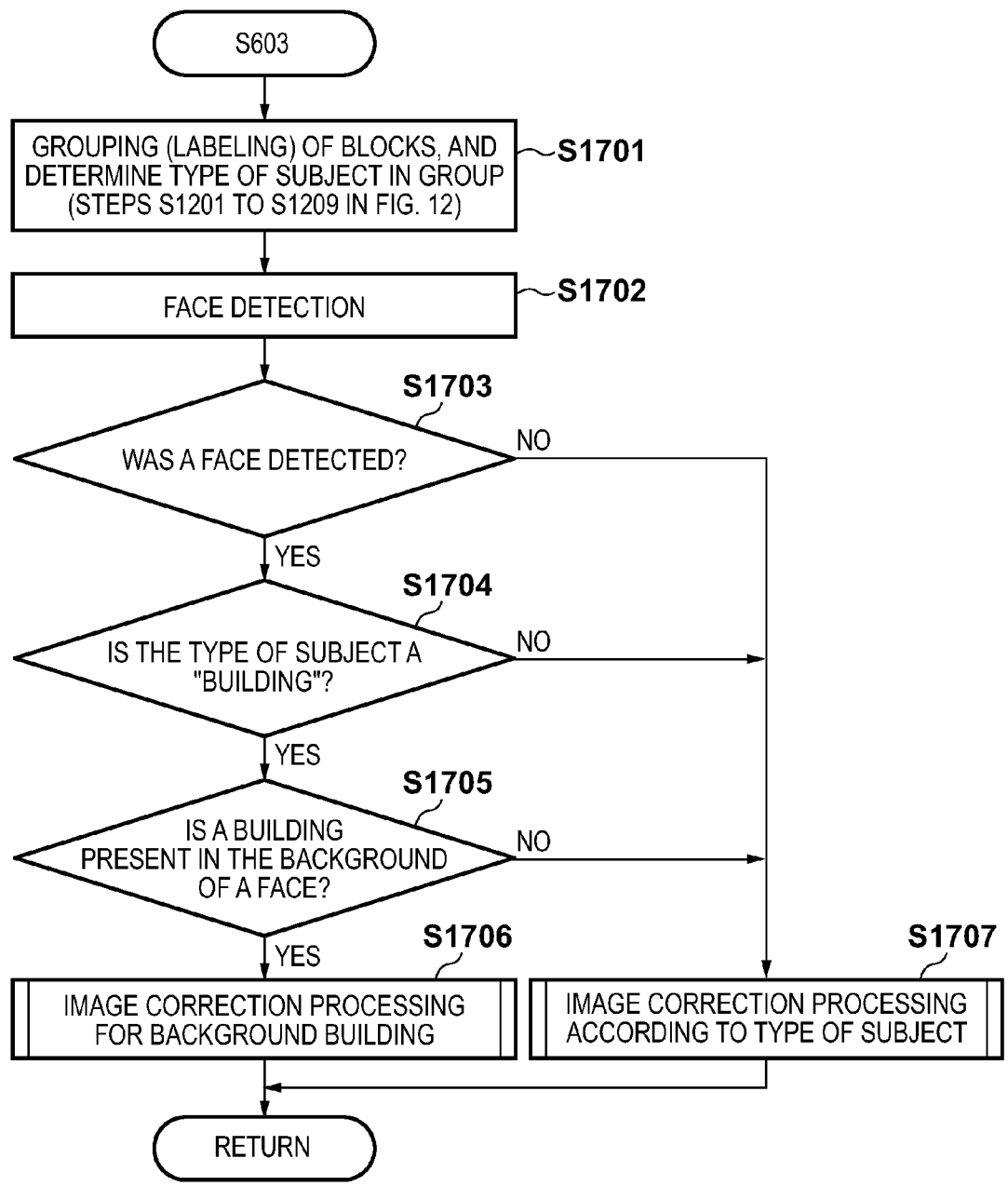
F I G. 17

IMAGE PROCESSING APPARATUS AND METHOD FOR CONTROLLING SAME

BACKGROUND OF THE INVENTION

1. Field of the Invention

The present invention relates to an image processing apparatus and to a method for controlling this apparatus.

2. Description of the Related Art

There are conventional image processing apparatus with which the contour (edge) of an image is detected and contour enhancement processing is performed according to the characteristics of the contour. Also known is an image processing apparatus with which the type of subject in an image is determined, and image processing is performed according to the determined type of subject.

For example, Japanese Patent Laid-Open No. 2000-59651 discloses an image processing apparatus with which the degree of contour enhancement is controlled according to the brightness level of an input signal. With the technique of Japanese Patent Laid-Open No. 2000-59651, the contour enhancement is weakened for video signal portions with a low brightness level, and is strengthened for video signal portions with a high brightness level. Also, Japanese Patent Laid-Open No. 2002-190984 discloses an image processing apparatus which determines whether an image is a landscape image or a text image, and if it is a text image, performs control to strengthen the contour enhancement.

With the technique disclosed in Japanese Patent Laid-Open No. 2000-59651, however, because the degree of contour enhancement is controlled on the basis of just the brightness of the contour to be corrected, contour enhancement will be performed to the same degree as long as the brightness is the same, no matter what the contour portion of a subject is. As a result, depending on the subject, the contour enhancement may be too strong, or conversely it may be insufficient, which is a problem in that the proper processing cannot be performed adequately on the subject.

With the technique disclosed in Japanese Patent Laid-Open No. 2002-190984, the type of image (whether it is a text image or a landscape image) is determined according to the brightness distribution. However, Japanese Patent Laid-Open No. 2002-190984 does not disclose a discrimination technique that is suited to discriminating between anything other than a text image and a landscape image (such as discriminating between a manmade object such as a building and a natural object such as a flower or a landscape). Even if an attempt was made to utilize the technique of Japanese Patent Laid-Open No. 2002-190984 to discriminate between manmade and natural objects, it would still be difficult to discriminate with high accuracy because no clear characteristic difference is obtained in relation to the brightness distribution between manmade and natural objects. Therefore, it is difficult to change the degree of contour enhancement between buildings and natural objects, for example.

SUMMARY OF THE INVENTION

The present invention was conceived in light of this situation, and provides a technique that allows the type of subject included in an image to be determined with high accuracy.

According to an aspect of the present invention, there is provided an image processing apparatus, comprising: an acquisition unit configured to acquire image data expressing an image including a specific subject; a production unit configured to produce a contour signal expressing a contour portion included in the image; a detection unit configured to detect, on the basis of the contour signal, a representative contour direction for each of a plurality of division regions obtained by dividing up the image, the detection unit detecting a specific direction as the representative contour direction when the direction of the entire contour portion included in the division regions is biased in the specific direction by at least a specific degree; a determination unit configured to determine a type of the subject on the basis of at least one of the following: a direction-based frequency distribution of the detected representative contour directions, a degree to which the division regions in which a representative contour direction of a predetermined direction was detected are continuously aligned in a direction perpendicular to the predetermined direction in the image, and a number of representative contour directions detected; and a correction unit configured to correct the image data according to a correction method corresponding to the type of the subject.

According to another aspect of the present invention, there is provided a method for controlling an image processing apparatus, comprising: an acquisition step of acquiring image data expressing an image including a specific subject; a production step of producing a contour signal expressing a contour portion included in the image; a detection step of detecting, on the basis of the contour signal, a representative contour direction for each of a plurality of division regions obtained by dividing up the image, wherein a specific direction is detected as the representative contour direction when the direction of the entire contour portion included in the division regions is biased in the specific direction by at least a specific degree; a determination step of determining a type of the subject on the basis of at least one of the following: a direction-based frequency distribution of the detected representative contour directions, a degree to which the division regions in which a representative contour direction of a predetermined direction was detected are continuously aligned in a direction perpendicular to the predetermined direction in the image, and a number of representative contour directions detected; and a correction step of correcting the image data according to a correction method corresponding to the type of the subject.

With the above constitution of the present invention, it is possible to determine with high accuracy the type of subject included in an image.

Further features of the present invention will become apparent from the following description of exemplary embodiments with reference to the attached drawings.

BRIEF DESCRIPTION OF THE DRAWINGS

FIG. 4A is a diagram of an example of an input signal.

FIG. 4B is a diagram of an example of a filter.

FIG. 4C is a diagram of an example of a vertical BPF 221.

FIG. 4D is a diagram of an example of a horizontal BPF 222.

FIG. 4E is a diagram of an example of an upper-right BPF 223.

FIG. 4F is a diagram of an example of a lower-right BPF 224.

FIG. 6A is a flowchart giving an overview of subject type determination processing, and image correction processing according to the type of subject, in the first embodiment.

FIG. 6B is a flowchart of the details of the processing in step S602 in FIG. 6A.

FIG. 9A is a diagram of a subject and how block division is done.

FIG. 9B is a diagram in which the representative contour directions (contour portions) of the blocks corresponding to FIG. 9A are indicated by lines.

FIG. 9C is a diagram of an example of contour direction connectivity.

FIGS. 11A and 11B are tables showing examples of parameters of image correction processing corresponding to various subjects.

FIGS. 13A to 13D are diagrams illustrating the grouping (labeling) of blocks.

FIG. 16 is a flowchart of the details of processing in step S611 in FIG. 6B in a third embodiment.

FIG. 17 is a flowchart of the details of processing in step S603 in FIG. 6A in a fourth embodiment.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
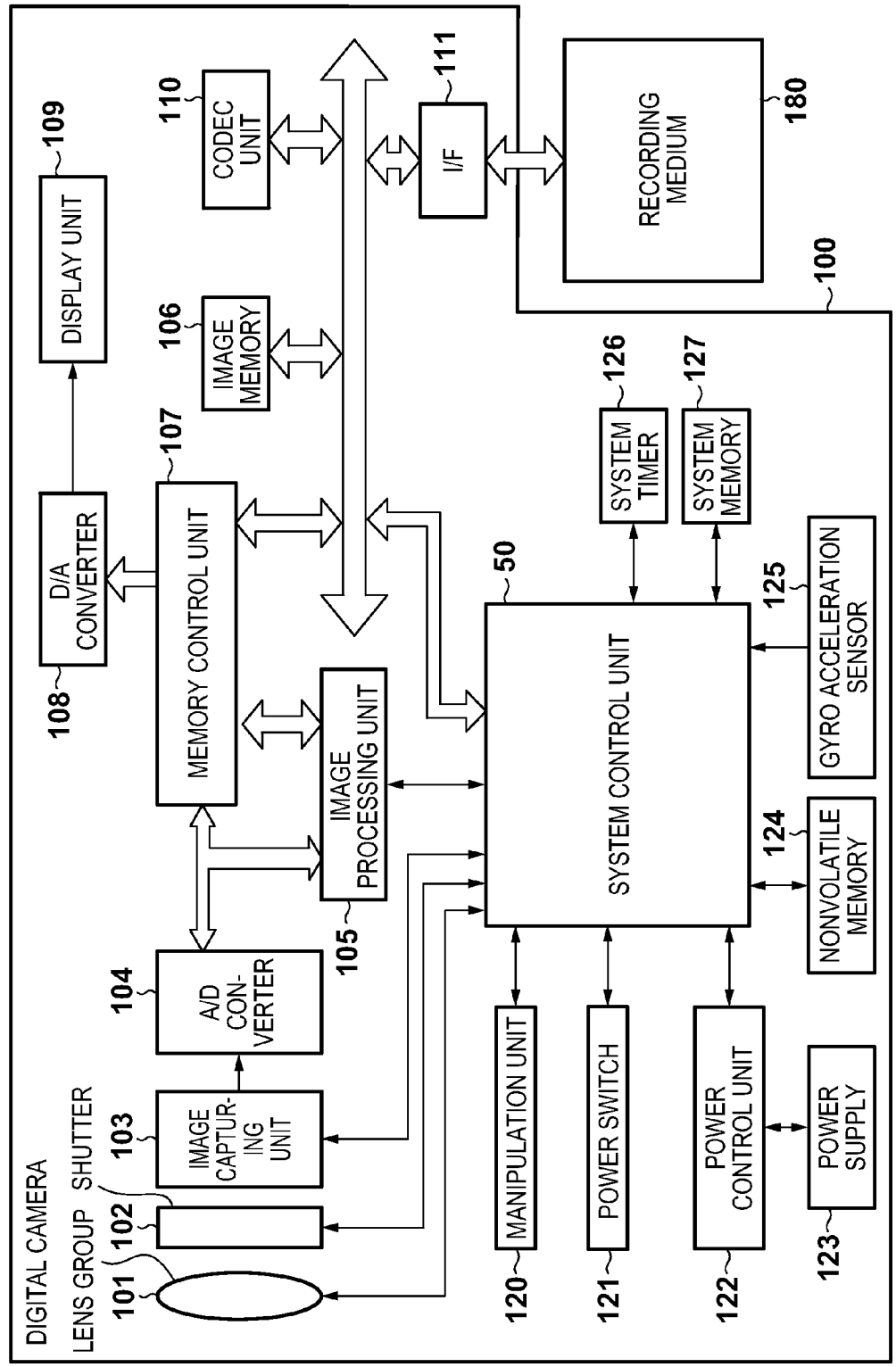
FIG. 1 is a block diagram of an example of the configuration of a digital camera 100 according to a first embodiment.

An embodiment in which the image processing apparatus of the present invention is applied to a digital camera will now be described through reference to FIGS. 1 to 5A and 6A to 13D. FIG. 1 is a block diagram of an example of the configuration of a digital camera 100 according to a first embodiment.

In FIG. 1, 101 is a lens group that includes a zoom lens and a focus lens, 102 is a shutter having an aperture function, and 103 is an image capturing unit constituted by a CCD, a CMOS element, or the like that converts an optical image into an electrical signal. 104 is an A/D converter that converts an analog signal into a digital signal, and 105 is an image processing unit that performs various kinds of image correction processing, such as gamma processing, color correction processing, contour enhancement processing, or noise reduction processing, on image data outputted from the A/D converter 104. 106 is an image memory, 107 is a memory control unit that controls the image memory 106, 108 is a D/A converter that converts an inputted digital signal into an analog signal, 109 is an LCD or other such display unit, and 110 is a codec unit that subjects image data to compression coding and decoding.

180 is a memory card, hard disk, or other such recording medium, 111 is an interface with the recording medium 180, and 50 is a system control unit that controls the entire system of the digital camera 100.

120 is a manipulation unit for inputting various operational commands, 121 is a power switch, 122 is a power control unit, and 123 is a power supply. The power control unit 122 is made up of a battery detection circuit, a DC-DC converter, a switching circuit for switching the blocks to which current is supplied, and so forth, and is used to detect whether a battery has been installed, the type of battery, and the remaining battery charge. The power control unit 122 also controls the DC-DC converter on the basis of these detection results and a command from the system control unit 50, and supplies the required voltage to the various units of the digital camera 100, including the recording medium 180, as long as required.

124 is a nonvolatile memory capable of electrical deletion and recording, and is an EEPROM or the like, for example. 125 is a gyro acceleration sensor that detects the tilt and acceleration of the digital camera 100. 126 is a system timer that keeps track of time used in various kinds of control, or the time on a built-in clock, and 127 is a system memory that expands programs and the like read from the nonvolatile memory 124, as well as constants and variables used in the operation of the system control unit 50.

Next, the basic operation during subject capture with the digital camera 100 configured as above will be described. The image capturing unit 103 subjects light that is incident through the lens group 101 and the shutter 102 to opto-electronic conversion, and outputs the product to the A/D converter 104 as an input image signal. The A/D converter 104 converts the analog image signal outputted from the image capturing unit 103 into a digital image signal, and outputs the product to the image processing unit 105.

The image processing unit 105 subjects image data from the A/D converter 104, or image data from the memory control unit 107, to white balance processing or other such color conversion processing, and to gamma processing, contour enhancement processing, noise reduction processing, and so forth, which will be described later. The image processing unit 105 also uses captured image data to perform specific calculation processing, and the system control unit 50 performs exposure control and metering control on the basis of the calculated result thus obtained. Consequently, TTL (through-the-lens)-style AF (auto focus) processing, AE (auto exposure) processing, and EF (electronic pre-flash) processing are performed. The image processing unit 105 further uses captured image data to perform specific calculation processing, and also performs TTL-style AWB (auto white balance) processing on the basis of the calculated result thus obtained.

The image data outputted from the image processing unit 105 is written to the image memory 106 via the memory control unit 107. The image memory 106 holds image data outputted from the image capturing unit 103, and image data for display on the display unit 109.

The D/A converter 108 converts the display-use image data held in the image memory 106 into an analog signal, and supplies it to the display unit 109. The display unit 109 performs display according to the analog signal from the D/A converter 108 on an LCD or other display device.

The codec unit 110 subjects the image data recorded to the image memory 106 to compression coding according to a standard such as MPEG. The system control unit 50 stores the coded image data in the recording medium 180 via the interface 111.

The above is the basic operation during subject capture. In addition to the basic operation discussed above, the system control unit 50 also performs the various processing of this embodiment discussed below by executing programs recorded to the above-mentioned nonvolatile memory 124. The word program as used in this embodiment means a program for executing the processing of the various flowcharts discussed below. The system control unit 50 here expands constants and variables used for the operation of the system control unit 50, as well as programs and so forth read from the nonvolatile memory 124, in the system memory 127.

Figure 2:
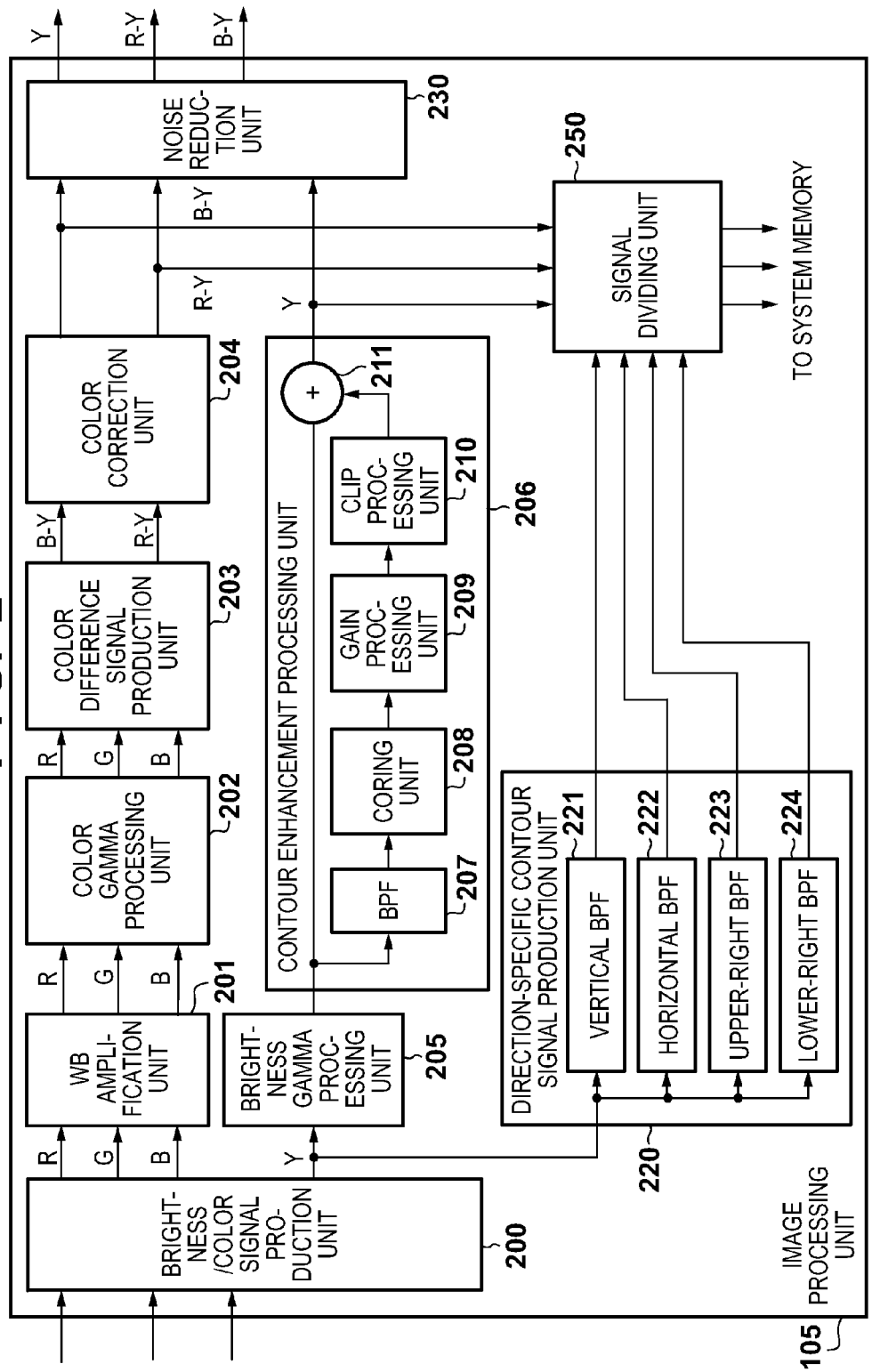
FIG. 2 is a detail view of an image processing unit 105.

Next, the image processing unit 105 will be described in detail through reference to FIG. 2. In FIG. 2, 200 is a brightness/color signal production unit, 201 is a WB amplification unit 201, 202 is a color gamma processing unit, 203 is a color difference signal production unit, 204 is a color correction unit, and 230 is a noise reduction unit. 205 is a brightness gamma processing unit, and 206 is a contour enhancement processing unit. In the contour enhancement processing unit 206, 207 is a bandpass filter (BPF), 208 is a coring unit, 209 is a gain processing unit, 210 is a clip processing unit, and 211 is an addition processing unit. 220 is a direction-specific contour signal production unit, in which 221 is a BPF for the vertical direction, 222 is a BPF for the horizontal direction, 223 is a BPF for the upper-right (diagonal) direction, and 224 is a BPF for the lower-right (diagonal) direction. 250 is a signal dividing unit.

Next, the processing performed by the image processing unit 105 will be described. The image data inputted from the A/D converter 104 or the memory control unit 107 in FIG. 1 is inputted to the image processing unit 105. The image data inputted to the image processing unit 105 is then inputted to the brightness/color signal production unit 200. The brightness/color signal production unit 200 produces a brightness signal Y and color signals R, G, and B from the inputted image data. The color signals R, G, and B are outputted to the WB amplification unit 201, while the brightness signal Y is outputted to the brightness gamma processing unit 205 and the direction-specific contour signal production unit 220.

The WB amplification unit 201 adjusts the white balance by applying gain to the color signals R, G, and B on the basis of the white balance gain values calculated by the system control unit 50. The color gamma processing unit 202 performs gamma correction on the color signals R, G, and B. The color difference signal production unit 203 produces color difference signals R-Y and B-Y from the color signals R, G, and B, and outputs these to the color correction unit 204. The color correction unit 204 then adjusts the hue and saturation by applying gain to the color difference signals R-Y and B-Y, for example. The color correction unit 204 outputs the corrected color difference signals R-Y and B-Y to the noise reduction unit 230 and the signal dividing unit 250.

Figure 3A:
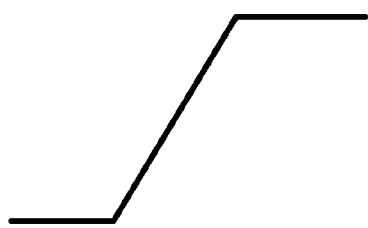
FIGS. 3A to 3G are diagrams of examples of contour enhancement processing with a contour enhancement processing unit 206.
Figure 3F:
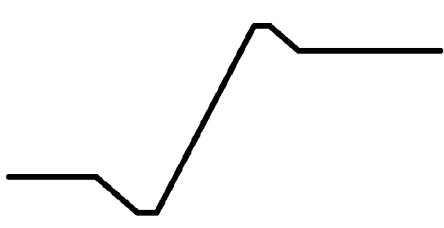
Figure 3B:
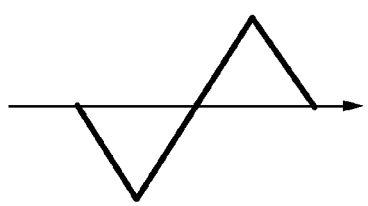

Meanwhile, the brightness gamma processing unit 205 performs gamma correction on the brightness signal Y, and outputs the product to the contour enhancement processing unit 206. FIGS. 3A to 3G are diagrams of examples of contour enhancement processing at the contour enhancement processing unit 206. FIG. 3A shows a portion of the brightness signal (horizontal signal) inputted to the contour enhancement processing unit 206.

Figure 3G:
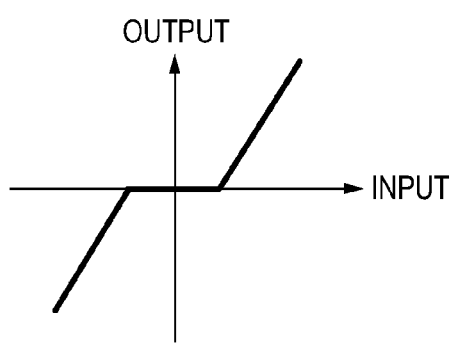
Figure 3C:
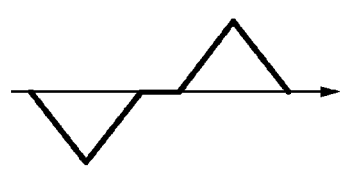
Figure 3D:
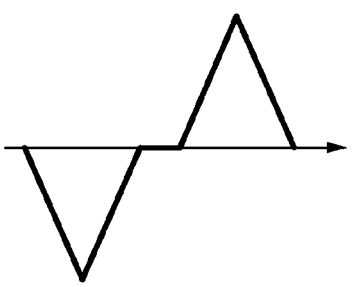
Figure 3E:
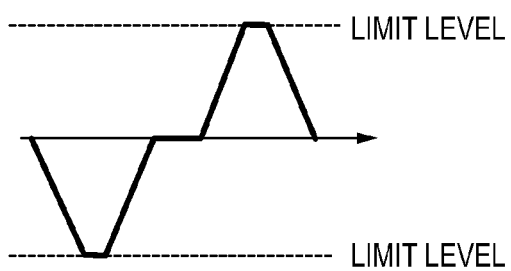

The BPF 207 is a bandpass filter that extracts a specific frequency band. The original inputted signal (FIG. 3A) is subjected to bandpass filtering to obtain the contour signal shown in FIG. 3B. The output signal from the BPF 207 is outputted to the coring unit 208. As shown in FIG. 3G, the coring unit 208 performs clip processing on a tiny portion of the input portion. As a result, the input signal has the shape shown in FIG. 3C. The output signal from the coring unit 208 is inputted to the gain processing unit 209. The gain processing unit 209 applies gain to the input signal. The signal obtained by applying gain to the signal in FIG. 3C is shown in FIG. 3D. The output signal from the gain processing unit 209 is inputted to the clip processing unit 210. The clip processing unit 210 clips an input signal that is higher (or lower) than a specific limit level to the limit level. An example of this clipping is shown in FIG. 3E. The output signal from the clip processing unit 210 is outputted to the addition unit 211. The addition unit adds the original signal (FIG. 3A) to the contour signal (FIG. 3E) outputted from the clip processing unit 210, and produces a brightness signal (FIG. 3F) with an enhanced contour. The contour enhancement processing unit 206 outputs the brightness signal Y whose contour has been enhanced as discussed above to the noise reduction unit 230 and the signal dividing unit 250. Only contour enhancement in the horizontal direction was described above, but the same contour enhancement processing is performed in the vertical direction.

Next, the processing of the noise reduction unit 230 will be described. The noise reduction unit 230 performs spatial noise reduction processing. More specifically, it performs processing with an ϵ filter. An epsilon filter uses the differential between the pixel of interest to be processed and the surrounding pixels, as local information. If this differential is less than the ϵ value, a low-pass filter is applied. When the ϵ filter is expressed as a one-dimensional signal, it is as follows.

$$x'(n) = x(n) - \sum_{k=-N}^{N} a_k f\{x\} \qquad \text{Equation 1}$$

Here, x(n) is the pixel value at a pixel position n, and x'(n) is the pixel value after ϵ filtering. Also, f(x) is given by the following equation.

$$f(x) = \begin{cases} x(n) - x(n-k) & \text{if} |x(n) - x(n-k)| \leq \varepsilon \\ 0 & \text{otherwise} \end{cases} \qquad \text{Equation 2}$$

Here, $a_k$ is the filter coefficient of the low-pass filter, and is designed so that the sum will be one.

The noise reduction unit 230 outputs the brightness signal Y and the color difference signals R-Y and B-Y that have undergone noise reduction processing as above to the image memory 106 via the memory control unit 107.

Next, the processing of the direction-specific contour signal production unit 220 will be described. The direction-specific contour signal production unit 220 applies the four kinds of BPF in parallel to the inputted brightness signal Y, and outputs the four kinds of image signal (contour signal) that have passed through the BPFs to the signal dividing unit

250. The direction-specific contour signal production unit 220 uses a contour detecting filter (BPF) of 3×3 pixels in each contour direction to extract the contour components (contour signals) for the horizontal direction, vertical direction, upper-right direction, and lower-right direction from the brightness signal Y.

The contour detecting filters (BPFs 221 to 224) will be described through reference to FIGS. 4A to 4F. FIG. 4A shows an input signal f (i, j), and FIG. 4B shows the filter applied to the input signal f (i, j). The output signal f' (i, j) produced by filtering is calculated from the following equation.

$$f'(i, j) = \sum_{l=-1}^{1} \sum_{k=-1}^{1} f(i+k, j+l)a(k, l) \qquad \text{Equation 3}$$

The contour component for each direction can be extracted by varying the filter coefficient in the above equation. FIGS. 4C to 4F show examples of filter coefficients for detecting the contour in each direction. FIG. 4C is an example of a vertical contour (horizontal line) detecting filter used by the vertical BPF 221, and FIG. 4D is an example of a horizontal contour (vertical line) detecting filter used by the horizontal BPF 222. FIG. 4E is an example of a diagonal (lower-right line) detecting filter used by the upper-right BPF 223, and FIG. 4F is an example of a diagonal (upper-right line) detecting filter used by the lower-right BPF 224.

As discussed above, the direction-specific contour signal production unit 220 produces an image signal (contour signal) expressing the contour portion for each direction included in an image, and outputs this signal to the signal dividing unit 250.

Figure 5A:
FIG. 5A is a diagram of an example of dividing up an image with a signal dividing unit 250 in the first embodiment.

The signal dividing unit 250 divides the inputted image signal into a plurality of division regions (8×8 blocks) shown in FIG. 5A, and performs signal computation for each block. In this embodiment, the brightness signal Y, the color difference signals R-Y and B-Y, and a contour signal from the direction-specific contour signal production unit 220 are inputted to the signal dividing unit 250. The signal dividing unit 250 calculates the average value for each block from the brightness signal Y and the color difference signals R-Y and B-Y. The signal dividing unit 250 also calculates the sum for each block from the contour signals outputted from the direction-specific contour signal production unit 220. The more contour components there are included in a block, the greater is the sum, so the sum can be used as an indicator of the quantity of contour components included in the block. Since contour signals related to four directions are outputted from the direction-specific contour signal production unit 220, the sum is also calculated for each of the four directions. The data calculated by the signal dividing unit 250 is stored in the system memory 127.

The image processing unit 105 was described in detail above. Next, processing to determine the type of subject and image correction processing according to the type of subject according to the first embodiment will be described through reference to the flowcharts in FIGS. 6A, 6B, and 7. When the power to the digital camera 100 is switched on and the apparatus is ready for image capture, the processing in the flowchart of FIG. 6A begins.

In step S602, the system control unit 50 determines the type of subject included in an input image. In this embodiment, the system control unit 50 identifies whether the subject is a building or a natural object (such as a flower or a landscape). Details of the processing in step S602 will be described through reference to FIG. 6B.

In step S610, the image processing unit 105 produces contour signals from the inputted image for each of the four directions (vertical, horizontal, upper-right, and lower-right) by the method discussed above, calculates the sum of the contour signals in each direction for every block, and stores the result in the system memory 127. The system control unit 50 acquires from the system memory 127 the sum of the contour signals for every block and every direction thus calculated.

In step S611, the system control unit 50 classifies the 8×8 blocks according to the characteristics of the contour, on the basis of the sum of the contour signals acquired in step S610, and detects a representative contour direction for every block. The "representative contour direction" is a representative direction related to the entire contour portion included in the block, and if the direction of the entire contour portion is biased in a specific direction by at least a specific degree, then this specific direction is detected as the representative contour direction. Therefore, no representative contour direction is detected when there is no pronounced bias in the direction of the entire contour portion, or when not very much of the contour portion is included (when the sum of the contour signals is small). Details of the processing in step S611 will be described through reference to FIG. 7.

In step S701, the system control unit 50 begins loop processing on the 8×8 blocks one at a time.

In step S702, the system control unit 50 determines whether or not at least one of the sums of the contour signals in the four directions (vertical, horizontal, upper-right, and lower-right) of the block being processed is greater than a threshold TH1. If the value is greater than TH1, the processing proceeds to step S703, and otherwise the processing proceeds to step S709.

In step S703, the system control unit 50 determines whether or not at least two of the sums of the contour signals in the four directions (vertical, horizontal, upper-right, and lower-right) of the block being processed are greater than a threshold TH2 (where TH2>TH1). If these values are greater than TH2, the processing proceeds to step S707, and otherwise the processing proceeds to step S704.

In step S704, the system control unit 50 detects the maximum value from among the sums of the contour signals in the four directions (vertical, horizontal, upper-right, and lower-right) of the block being processed. This maximum value shall be termed E1.

In step S705, the system control unit 50 acquires the sum of the contour signals in a direction perpendicular to the direction of the maximum value detected in step S704. This sum shall be termed E2. For example, if the direction of the maximum value is the horizontal direction (that is, if the contour is pronounced in the horizontal direction (vertical line)), then the direction that is perpendicular will be the vertical direction (direction of horizontal line). Similarly, if the direction of the maximum value is the upper-right direction (that is, if the contour is pronounced in the upper-right direction (lower-right line)), then the direction that is perpendicular will be the lower-right direction (direction of upper-right line).

In step S706, the system control unit 50 determines whether or not the contour strength in the direction of the maximum value is sufficiently high compared to the contour strength of the direction that is perpendicular. More specifically, for example, the system control unit 50 determines whether or not E1<k*E2 (k<1). If E1<k*E2, then the processing proceeds to step S708, and otherwise the processing proceeds to step S707.

Figure 8:
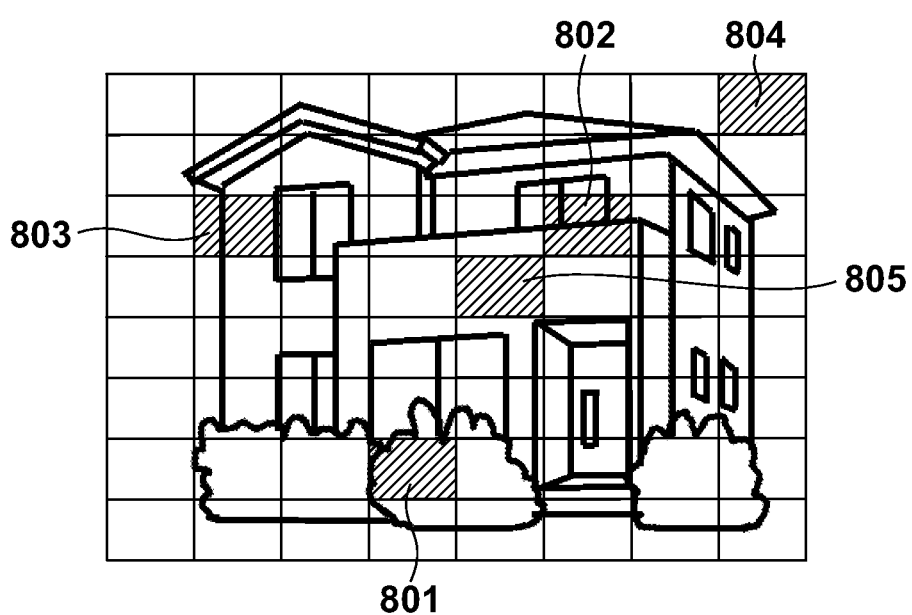
FIG. 8 is a diagram of an example of block classification.

In step S707, the system control unit 50 classifies the block being processed as a "directionless block (complex block)." A "directionless block" is a block that includes many contour signals within the block, but in which the contour signals are not biased in a specific direction. In a directionless block, no representative contour direction will be detected. FIG. 8 is a diagram of an example of block classification. A block that includes contour signals in various directions as in block 801, or a block that includes contour signals in two perpendicular directions as in block 802 is classified as a directionless block.

In step S708, the system control unit 50 classifies the block being processed as a "contour block," and detects the direction of the maximum value detected in step S704 as the representative contour direction. The system control unit 50 records the detected representative contour direction to the system memory 127. A "contour block" is a block having a distinct contour portion in only a specific direction, as with the block 803 in FIG. 8.

In step S709, the system control unit 50 classifies the block being processed as a contourless block." A contourless block is a flat block that has no contour portion, as with the blocks 804 and 805 in FIG. 8. No representative contour direction is detected in a contourless block.

As discussed above, classification of blocks and detection of the representative contour direction are carried out for the 8×8 blocks one at a time. Also, as discussed above, the system control unit 50 records the detected representative contour direction for "contour blocks" in the system memory 127.

Returning to FIG. 6B, in step S612 the system control unit 50 begins loop processing of the 8×8 blocks one at a time.

In step S613, the system control unit 50 determines whether or not the block being processed is a "contour block" (a block for which a representative contour direction was detected). If it is a "contour block," the processing proceeds to step S614, and otherwise (if it is a "directionless block" or a "contourless block") the processing returns to step S612 and the next block to be processed is selected.

In step S614, the system control unit 50 calculates the contour direction connectivity of the contour (that is, the contour of a vertical line) in a specific direction (the horizontal direction here). The calculation of the contour direction connectivity will be described in detail through reference to FIGS. 9A to 9C.

FIG. 9A is a diagram of a subject and how block division is done. Here, we will describe a case of calculating the contour direction connectivity of a block 901. To calculate the contour direction connectivity of a block with vertical lines, the system control unit 50 first determines whether or not the representative contour direction of the block being processed is the horizontal direction (vertical line). If it is the horizontal direction (vertical line), the system control unit 50 counts the number of blocks in which the representative contour direction is the horizontal direction (vertical line) that are continuously aligned in a direction perpendicular to the representative contour direction (that is, the up and down direction of that block), and this count shall be termed the contour direction connectivity. FIG. 9B is a diagram in which the representative contour directions of the blocks corresponding to FIG. 9A (contour portions) are indicated by lines (these lines are lines in a direction perpendicular to the representative contour direction). If the contour direction connectivity of the block 901 (the block being processed) is calculated here, the system control unit 50 counts how many blocks having a representative contour direction in the horizontal direction (vertical line) are continuously aligned, in relation to the upper and lower blocks adjacent to the block 901. In the example of the block 901, since there are in total three blocks aligned continuously, with one above and two below, the contour direction connectivity of the block 901 is 3. Similarly, when the contour direction connectivity in the horizontal direction (vertical line) is calculated for all the blocks, the result is as shown in FIG. 9C. The system control unit 50 finally calculates the sum for contour direction connectivity. This sum is an indicator of the degree to which blocks for which a specific representative contour direction (the horizontal direction here) was detected are aligned continuously in a direction perpendicular to this representative contour direction (the vertical direction here) in the inputted image.

In step S615, the system control unit 50 increments the counter of the representative contour direction for the block being processed (prior to step S612, the counter of each direction is initialized at zero). This processing ultimately yields the number of blocks for each representative contour direction.

As discussed above, whether or not a block is a "contour block" is determined for the 8×8 blocks one at a time, and if a block is a "contour block," then calculation of the contour direction connectivity and counting of the number of blocks for each representative contour direction are performed.

After this, in step S616, the system control unit 50 determines the type of subject on the basis of at least one of the following: the direction-specific frequency distribution of the representative contour direction (that is, the number of blocks counted for each representative contour direction in step S615), the sum for contour direction connectivity, and the number of detected representative contour directions (that is, the number of "contour blocks"). The specific combination of this information (characteristics related to contour) can be suitably varied according to the type of subject determined, the required determination precision, and so on. Here, as one example, a case of determining whether the subject is a building or a natural object will be described through reference to FIGS. 10A and 10B.

Figure 10B:
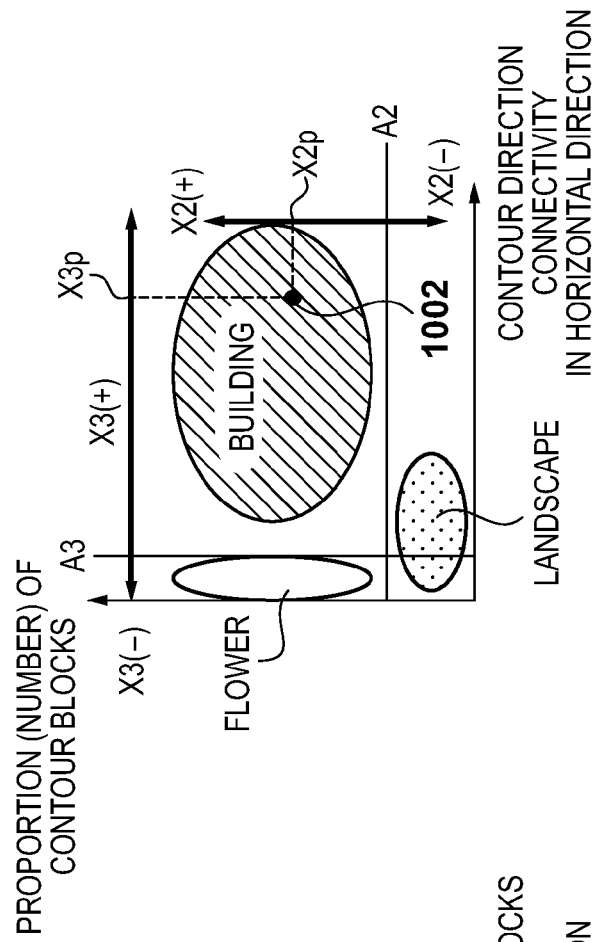
FIGS. 10A and 10B are graphs of the distribution by subject when various characteristics related to contour are plotted.
Figure 10A:
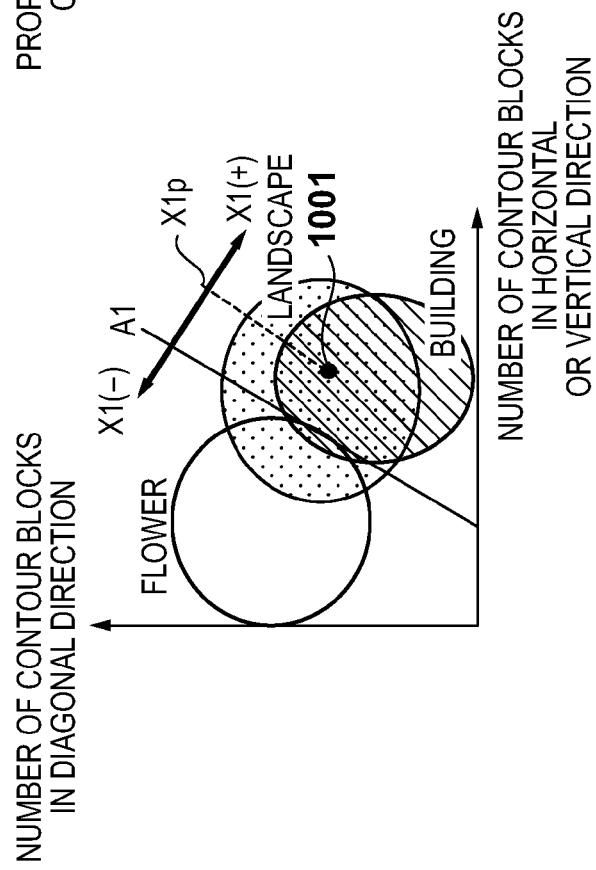

FIGS. 10A and 10B are graphs of the distribution by subject when various characteristics related to contour are plotted. In this embodiment, buildings are differentiated from natural objects (flowers or landscapes), so the distribution of buildings, flowers, and landscapes is shown. In FIG. 10A, the horizontal axis shows the number of blocks having a representative contour direction in the horizontal or vertical direction, and the vertical axis shows the number of blocks having a representative contour direction in a diagonal direction (upper-right or lower-right). In FIG. 10B, the horizontal axis shows the contour direction connectivity of the horizontal direction (vertical line), and the vertical axis shows the proportion (or number) of "contour blocks."

The system control unit 50 decides where the subject included in an inputted image is present in the graphs of FIGS. 10A and 10B on the basis of the sum of contour direction connectivity calculated in step S614 and the number of blocks for each representative contour direction counted in step S615 (the number of blocks for each representative contour direction is added as needed). For example, let us consider a case in which a certain subject is present at the locations of the characteristic point 1001 in FIG. 10A and the characteristic point 1002 in FIG. 10B.

Next, referring to FIG. 10A, and considering a specific axis A1 that separates two types of subject (a building and something else) and an X1 axis that is perpendicular to the axis A1, the point at which the characteristic point 1001 of the subject is projected on the X1 axis is calculated, and this point shall be termed X1$p$. Referring to FIG. 10B, similarly, we will consider axes X2 and X3 perpendicular to specific axes A2 and A3 that separate types of subject. Points at which the characteristic point 1002 is projected onto the axes X2 and X3 are similarly X2$p$ and X3$p$.

An evaluation value is calculated on the basis of the following equation from the values of X1$p$, X2$p$, and X3$p$ found as above.

$$\text{evaluation value} = \alpha X1p + \beta X2p + \gamma X3p$$

Here, $\alpha$, $\beta$, and $\gamma$ are preset weighting coefficients.

If the evaluation value is at or above a specific threshold, the system control unit 50 determines the type of subject to be a "building," and otherwise determines the type of subject to be a "natural object."

The processing of FIG. 6B (the processing of step S602 in FIG. 6A) was described above. Returning to FIG. 6A, in step S603 the image processing unit 105 performs image correction processing according to the type of subject (image correction processing by a correction method corresponding to the type of subject) under the control of the system control unit 50. More specifically, for example, the system control unit 50 sets the parameters of the contour enhancement processing unit 206 and the noise reduction unit 230 to values corresponding to the type of subject. The contour enhancement processing unit 206 and the noise reduction unit 230 execute contour enhancement processing and noise reduction processing according to the set parameters. An example of the parameters in image correction processing corresponding to various kinds of subject will be described through reference to FIG. 11A.

If the type of subject is a "building," then it is possible that image quality will be better with the contour strongly enhanced. In view of this, as shown in FIG. 11A, the center frequency of contour detection is set between medium and low. This is done by varying the parameter (coefficient) of the BPF 207 in FIG. 2. Also, the coring range is expanded in the coring unit 208. Specifically, in FIG. 3G, the range over which the input values are clipped is expanded. Also, the gain processing unit 209 is controlled to increase the gain of contour enhancement. Furthermore, the E value is increased in the noise reduction unit 230.

On the other hand, if the type of subject is a "natural object," it will look strange if the contour is enhanced too much, so it is better not to enhance the contour very strongly. Since the reproduction of fine detail is important in a natural object, it is best if there is not much loss of information about detail in coring and noise reduction. In view of this, the center frequency of contour detection is set between medium and high by varying the parameter of the BPF 207. The range of coring is set narrow in the coring unit 208, and the gain of the gain processing unit 209 is set weak. Also, the $\epsilon$ value is reduced in the noise reduction unit 230.

The processing in step S603 in FIG. 6A (image correction processing according to the type of subject) was described above. Next, in step S604, the system control unit 50 determines whether or not the processing should be ended. For instance, it is determined that processing should be ended if the power to the digital camera 100 has been switched off. If the processing is not ended, the flow returns to step S601 and the same processing is repeated.

As described above, in the first embodiment, the digital camera 100 divides an image into a plurality of blocks, detects the representative contour direction for each block, and determines the type of subject on the basis of the detection results (frequency distribution, contour direction connectivity, number of representative contour directions detected, etc.). Also, the digital camera 100 executes image correction processing according to a correction method corresponding to the type of subject.

Thus, by detecting the representative contour direction in block units, it is possible to detect characteristics related to the contour of a subject, and the result will be less apt to be affected by subject noise or fine patterns. Consequently, it is possible to determine with high accuracy the type of subject included in an image. As a result, it is possible to execute contour enhancement processing, noise reduction processing, or other such image correction processing that is suited to the type of subject. Also, since the representative contour direction is detected in block units, the computation load is reduced as compared to when a contour is detected in pixel units.

Furthermore, in this embodiment, processing by the contour enhancement processing unit 206 and processing by the noise reduction unit 230 were given as an example of image correction processing according to the type of subject, but the image correction processing is not limited to these. For instance, brightness gamma processing or color correction processing may be changed according to the type of subject. In this case, for a "building," the system control unit 50 controls the brightness gamma processing unit 205 to execute brightness gamma processing so as to strengthen the contrast. For a "natural object," the system control unit 50 controls the color correction unit 204 to execute color correction processing so as to raise the saturation.

Also, in this embodiment, only processing using an $\epsilon$ filter, which is a spatial filter, was described as processing by the noise reduction unit 230, but the method for noise reduction is not limited to this. For instance, a time filter that performs low-pass processing in the time direction may be used, in which case the parameter of the time filter may be varied according to the type of subject.

Also, in this embodiment, an example was discussed in which a "building" was distinguished from a "natural object," but as long as the representative contour direction is detected in block units, and the type of subject is determined using the frequency distribution, the contour direction connectivity, the number of representative contour directions detected, and so forth, then any type of subject may be determined.

Also, in this embodiment, the type of subject was determined as a binary choice between "building" and "natural object," but it does not necessarily have to be a binary determination. For instance, the higher is the evaluation value calculated in the example of FIGS. 10A and 10B, the greater the likelihood that the subject is a "building," so the parameter of image correction processing may be set toward building as the evaluation value rises, and set toward natural object as the evaluation value drops.

Also, in this embodiment, the classification of blocks (whether or not they have a contour) was decided on the basis of the sum of the contour signals, by direction, for the block being processed, but the block classification method is not limited to this. For instance, a method may be employed in which blocks are classified by using a brightness signal and a color signal in addition to a contour signal. In this case, the system is controlled so that a block is not determined to be a contour block if the brightness is above or below a specific threshold. Also, a color signal may be used to determine whether or not a block is a contour block or to detect a representative contour direction. In this case, if the average values for hue and saturation within a block satisfy a specific condition, then the block is determined not to be a contour block (or the condition for determining the representative contour direction is changed). More specifically, a block having many green signals of high saturation is not determined to be a contour block because of the low probability that the contour is of a building. Alternatively, even if a block is determined to be a contour block, the threshold for determining it to be a block having a horizontal or vertical contour is changed to make it less likely that it will be determined to have a horizontal or vertical direction. This makes it possible to further raise the accuracy of determining the type of subject.

Also, the block being processed may be compared with surrounding blocks, and determined to be a contour block if the sum of contour signals is large with respect to that of surrounding blocks. Here, the sum of contour signals is compared with that of adjacent blocks in the same direction as the contour direction. For example, if a contour block is detected in the horizontal direction (vertical line), the sum of contour signal is compared with that of the left and right adjacent blocks, which are in the same direction (the horizontal direction), and the block is determined to be a contour block if a larger differential in the sum of contour signals from that of the left and right blocks is at or above a specific threshold.

Modification Example

In the first embodiment, the image correction method varied with the type of subject, but correction was performed using the same parameters for the entire image. However, correction may be performed using parameters corresponding to the characteristics of different regions of an image. This will now be described through reference to FIG. 11B, FIG. 12, and FIGS. 13A to 13D.

Figure 12:
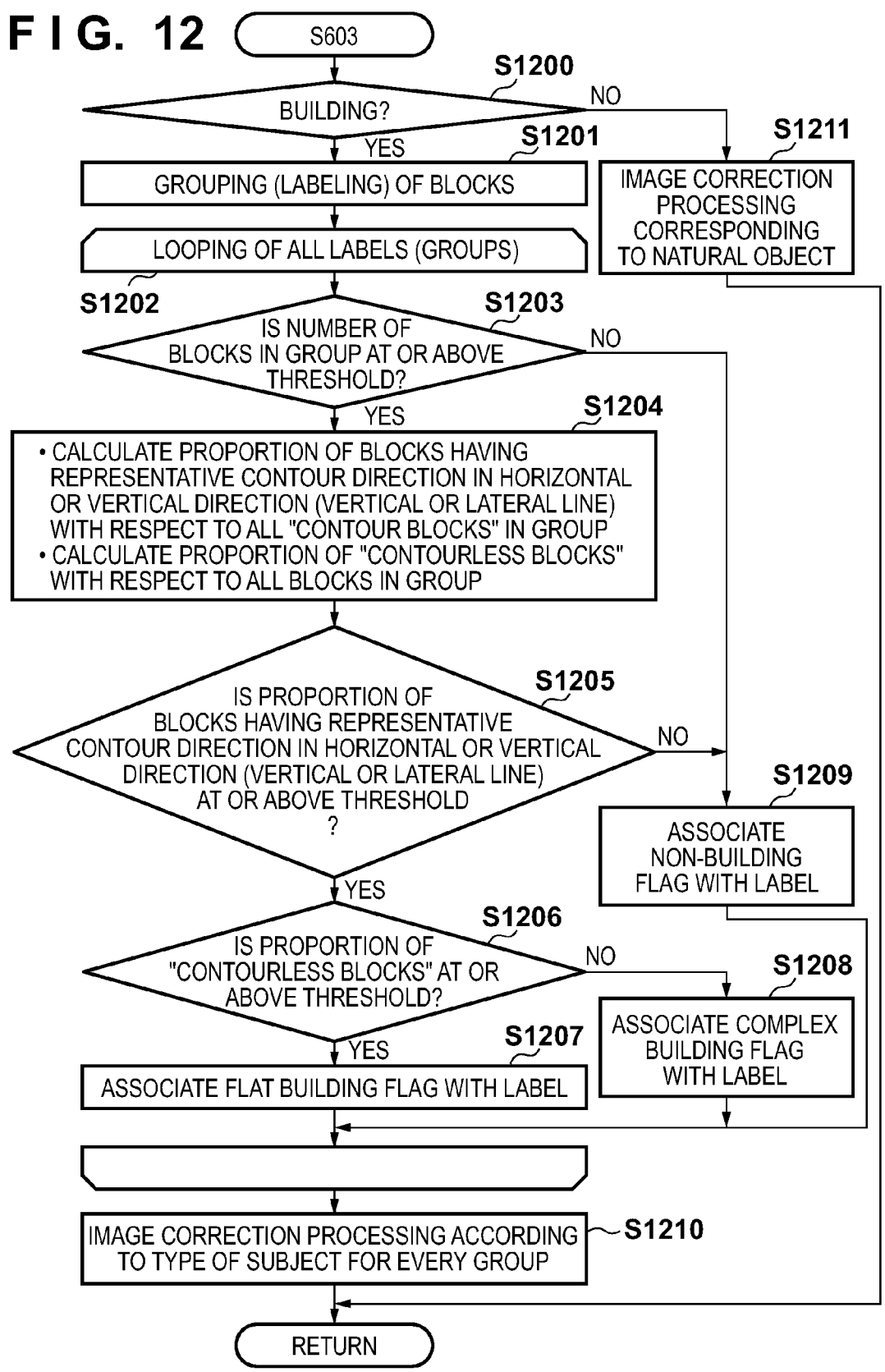
FIG. 12 is a flowchart of the details of processing in step S603 in FIG. 6A in a modification example of the first embodiment.

FIG. 12 is a flowchart of the details of processing in step S603 in FIG. 6A in a modification example of the first embodiment.

In step S1200, the system control unit 50 determines whether or not the type of subject determined in step S602 is a "building." If it is a "building," the processing proceeds to step S1201, and otherwise the processing proceeds to step S1211.

Steps S1201 to S1210 are executed when the subject has been determined to be a "building," and the location and characteristics of the building (whether it is a building with many flat portions, such as an office building, or is a building with intricate details, such as a church) are determined. More specifically, in step S1201, the system control unit 50 labels the 8×8 blocks on the basis of the similarity among the blocks, and thereby groups the blocks. Details of this labeling will be described through reference to FIGS. 13A to 13D.

FIG. 13A shows a captured subject image that has been divided into blocks. The system control unit 50 subjects these blocks to labeling while raster scanning the search range shown in FIG. 13B. In FIG. 13B, the block 1301 is the block being processed, and the blocks to the upper-left, above, to the upper-right, and to the left of the block being processed shall be termed reference blocks (shaded).

The system control unit 50 compares the block being processed with the reference blocks for brightness and color, and gives the block being processed the same label as that of the reference block with the closest brightness and color. For example, in FIG. 13C, a label of "2" is given to the block to the upper-left of the block being processed 1302, and a label of "3" is given to the blocks above, to the upper-right, and to the left. If at this point the reference block that is closest in brightness and color to the block being processed 1302 is the upper-left block, then the system control unit 50 gives a label of "2" to the block being processed 1302. If, however, there is no reference block, or if the difference between the block being processed and all of the reference blocks is over a specific value, the system control unit 50 gives a new label to the block being processed.

Thus, the system control unit 50 labels all of the blocks by similar regions. FIG. 13D is an example of labeling all the blocks of the subject in FIG. 13A. As a result of this labeling, the 8×8 blocks are grouped so that there will be at least a specific similarity among the blocks within a group (among division regions). The search range is not limited to that is shown in FIG. 13B. In FIG. 13D, the blocks in a group are arranged continuously, but depending on the setting of the search range, blocks belonging to the same group may be present at separated locations.

Returning to FIG. 12, in step S1202 the system control unit 50 begins loop processing on the labels given in step S1201, one at a time (in the example shown in FIG. 13D, the labels "0" to "3" are processed sequentially).

In step S1203, the system control unit 50 determines whether or not the size of the group of the label being processed (the number of blocks in the group) is at or above a specific threshold. If the size is at or above the specific threshold, the processing proceeds to step S1204, and otherwise the processing proceeds to step S1209.

In step S1204, the system control unit 50 calculates the proportion of blocks having a representative contour direction in the horizontal or vertical direction (vertical and horizontal lines) with respect to all of the "contour blocks" in the group of the label being processed. The system control unit 50 also calculates the proportion of "contourless blocks" (blocks in which the contour signals are at or below a specific amount, as can be understood from steps S702 and S709 in FIG. 7) with respect to all the blocks in the group of the label being processed.

In step S1205, the system control unit 50 determines whether or not the proportion of blocks having a representative contour direction in the horizontal or vertical direction (vertical and horizontal lines) calculated in step S1204 is at or above a threshold. If it is at or above the threshold, the processing proceeds to step S1206, and otherwise the processing proceeds to step S1209.

In step S1206, the system control unit 50 determines whether or not the proportion of "contourless blocks" calculated in step S1204 is at or above a threshold. If it is at or above the threshold, the processing proceeds to step S1207, and otherwise the processing proceeds to step S1208.

In step S1207, the system control unit 50 associates a flat building flag with the label being processed. This flag indicates that the subject in the group of the label being processed is a building having many flat surfaces, such as on an office building.

In step S1208, the system control unit 50 associates a complex building flag with the label being processed. This flag indicates that the subject in the group of the label being processed is a building having many intricate details, such as on a church.

In step S1209, the system control unit 50 associates a non-building label with the label being processed.

In step S1210, the image processing unit 105 performs image correction processing according to the type of subject in a group (image correction processing by a correction method corresponding to the type of subject in a group), for each group, under the control of the system control unit 50. The processing of step S1210 will be described in specific terms through reference to FIG. 11B. FIG. 11B is similar to FIG. 11A in that it shows an example of types of subjects and corresponding parameters for contour enhancement processing and noise reduction processing. FIG. 11B differs from the FIG. 11A in that when the type of subject is a "building," the parameters are stipulated for every type of subject within a group.

In the example in FIG. 11B, when the subject in a group is a flat building, the same parameters are used as with the "building" in FIG. 11A. On the other hand, in the case of a complex building, the center frequency of contour detection is set to between low and medium. Also, the coring range is narrowed, the gain is set to medium, and the $\epsilon$ value of noise reduction processing is reduced. This makes it possible to execute contour enhancement processing and noise reduction processing while minimizing the loss of information about details for buildings having intricate designs, such as a church. Furthermore, for non-building regions, the parameters are set to be the same as when the subject is a "natural object."

Returning to FIG. 12, in step S1211 the image processing unit 105 executes image correction processing corresponding to a "natural object" under the control of the system control unit 50. This processing is the same as when the subject is a "natural object" in step S603 of the first embodiment.

A case was described above of performing image correction processing for each group according to the type of subject in a group. In this modification example, a case in which the image processing parameters were set for every group in block units was described as an example, but if the image processing parameters are switched in block units, a step may appear at a group boundary that is attributable to the difference in image processing parameters. Accordingly, processing to reduce this step may be added, such as using a median value of two parameters at the group boundary.

Second Embodiment

A second embodiment of the present invention will now be described through reference to FIGS. 5B and 5C, and 14 to 15C. In this second embodiment, the type of subject is determined by substantially the same processing as in the first embodiment, but the determination processing also includes the state (zoom, focus, orientation, etc.) of the digital camera 100 during capture of an image. The configuration and basic operation of the digital camera 100 in the second embodiment are the same as those described for the first embodiment, and will therefore not be described in detail again (see FIGS. 1 and 2).

Figure 14:
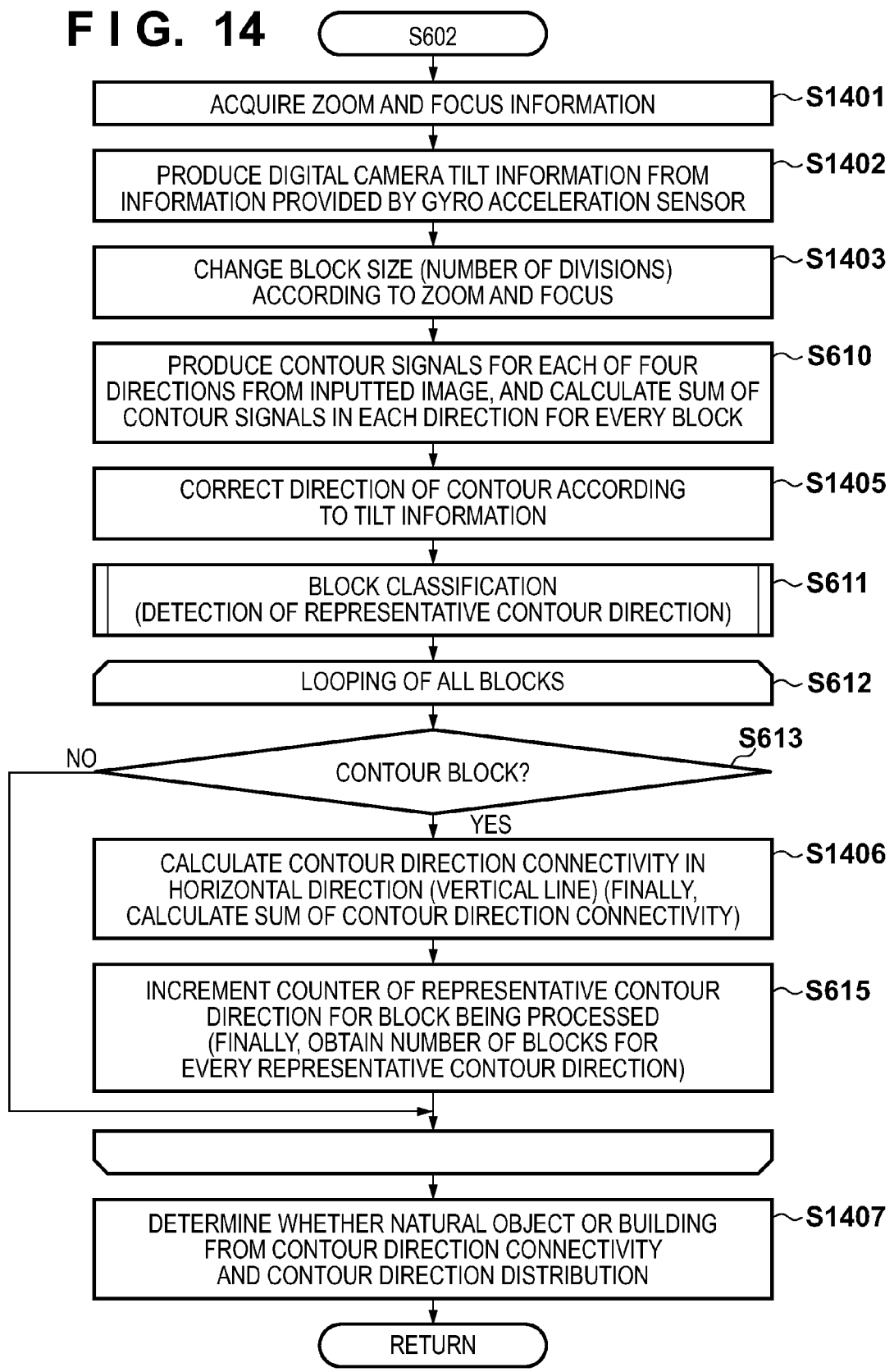
FIG. 14 is a flowchart of the details of processing in step S602 in FIG. 6A in the second embodiment.

In the second embodiment, the details of the processing in step S602 in FIG. 6A differ from those in the first embodiment, and the processing of FIG. 14 is executed instead of that in FIG. 6B. In FIG. 14, those blocks in which the same processing is performed as in FIG. 6B are numbered the same, and will not be described again.

In step S1401, the system control unit 50 acquires information indicating the current zoom and focus states from the lens group 101, and stores them in the system memory 127.

In step S1402, the system control unit 50 produces camera tilt information from the output of the gyro acceleration sensor 125, and stores this in the system memory 127.

Figure 5B:
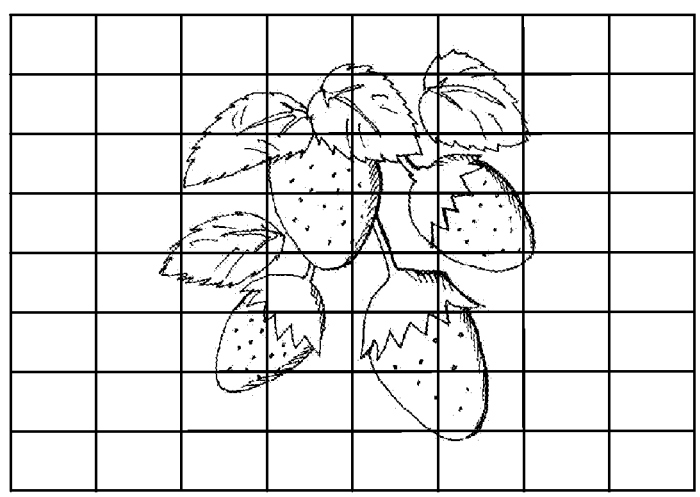
FIG. 5B is a diagram of an example of dividing up an image with the signal dividing unit 250 in a second embodiment when the zoom is to the telephoto side or the focal distance is at or below a specific threshold.
Figure 5C:
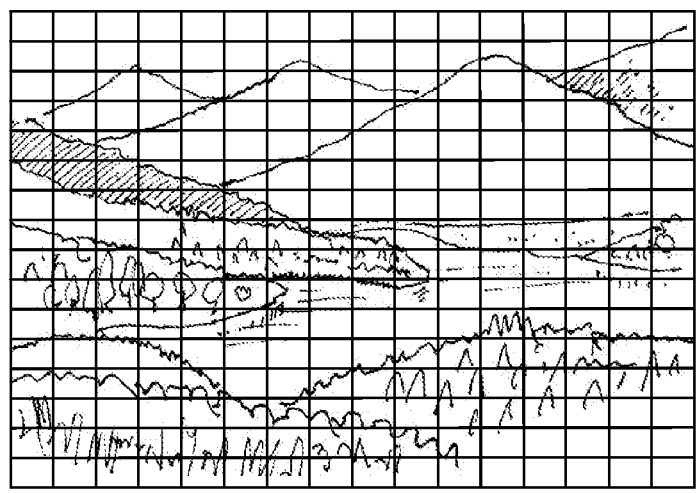
FIG. 5C is a diagram of an example of dividing up an image with the signal dividing unit 250 in the second embodiment when the zoom is to the wide angle side.

In step S1403, the system control unit 50 changes the block division size and number in the signal dividing unit 250 (see FIG. 2) on the basis of the zoom information and focus information acquired in step S1401. More specifically, the system control unit 50 increases the block size when the zoom is toward the telephoto end (when the zoom magnification is large) or when the focal distance is shorter than a specific threshold, and decreases the block size when the zoom is toward the wide angle end. Specifically, when the focal distance is shorter than a specific threshold, the block size is at least a specific size regardless of the zoom magnification. This example is shown in FIGS. 5B and 5C. FIG. 5B shows the block division (8×8 blocks in this example) when the zoom is toward the telephoto end or when the focal distance is shorter than a specific threshold. FIG. 5C, meanwhile, shows the block division (16×16 blocks in this example) when the zoom is toward the wide angle end. In this case, there are more blocks because the block size is reduced and information from the entire image is acquired. Controlling the system like this makes it possible to prevent the zoom from causing large fluctuations in the amount of information related to the subject shape and so forth for a single block.

Figure 15A:
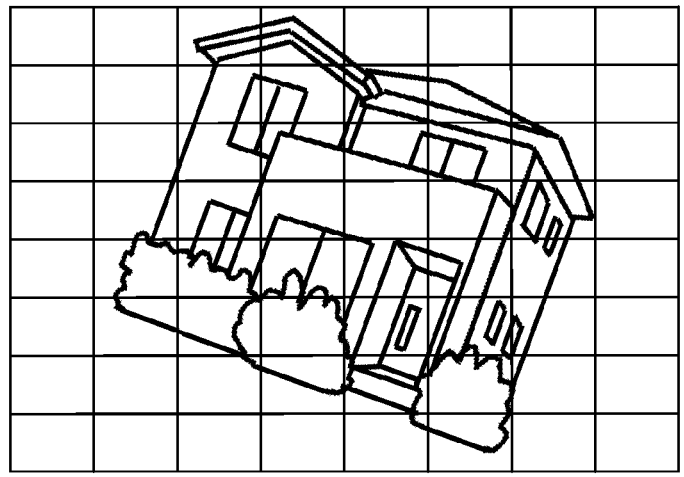
FIGS. 15A to 15C are concept diagrams of correction of the contour direction according to the tilt of the digital camera 100 in the second embodiment.

In step S1405, the system control unit 50 uses the tilt information produced in step S1402 to correct the direction of the contour. More specifically, the system control unit 50 corrects the contour direction when the digital camera 100 is tilted by at least a specific threshold. FIG. 15A shows an image captured in a state in which the digital camera 100 was tilted by more than a threshold (such as 30 degrees). Here, the direction of the contour is corrected according to the direction of tilt.

Figure 15B:
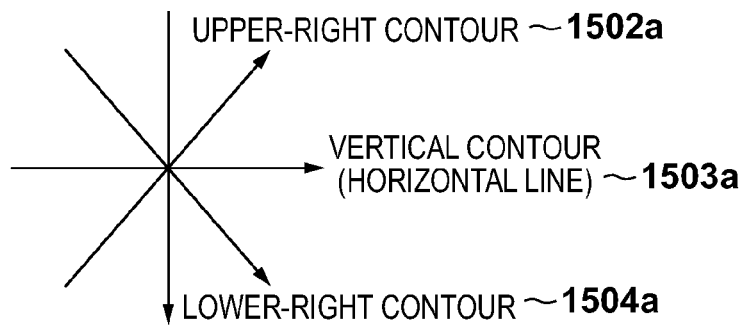
Figure 15C:
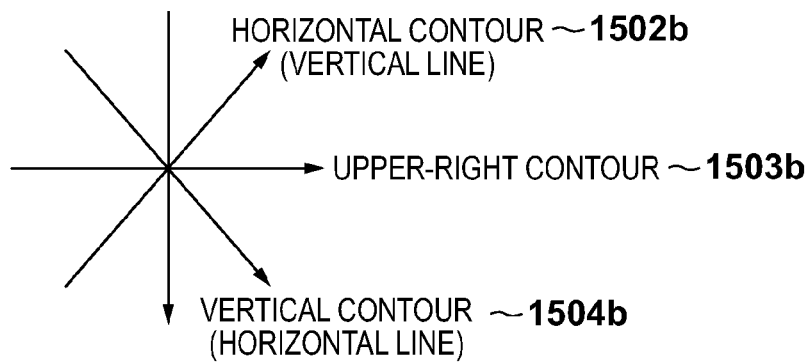

FIG. 15B shows the contour direction before correction, and FIG. 15C shows the contour direction after correction. That is, the system control unit 50 corrects so that a contour signal outputted as a horizontal contour (vertical line) 1501a is treated as a lower-right contour 1501b, and a contour signal outputted as an upper-right contour 1502a is treated as a horizontal contour (vertical line) 1502b. Similarly, the system control unit 50 corrects so that a contour signal outputted as a vertical contour (horizontal line) 1503a is treated as an upper-right contour 1503b, and a contour signal outputted as a lower-right contour 1504a is treated as a vertical contour (horizontal line) 1504b. Thus, only direction information is corrected according to the tilt.

The processing in step S1406 is the same as in step S614 in FIG. 6B, but the processing is slightly different when tilt is corrected in step S1405. For example, when the contour direction is corrected as shown in FIG. 15C, the horizontal contour (vertical line) is connected diagonally, the contour direction connectivity is calculated in a diagonal direction. In other words, in calculating the contour direction connectivity, connection in a direction perpendicular to the representative contour direction in question (the horizontal direction here) is evaluated, but this "perpendicular direction" is also corrected according to the correction of the contour direction.

The processing in step S1407 is the same as in step S616 in FIG. 6B, but the threshold for distinguishing whether the subject is a "building" or a "natural object" (A1 to A3 in FIGS. 10A and 10B) is changed on the basis of focus information. More specifically, the threshold is changed (A1 to A3 in FIGS. 10A and 10B) so that the subject will be less likely to be determined to be a "building" if the focal distance is less than a specific distance. For example, processing is performed to shift the axis A2 upward and to shift the axis A3 to the right.

As described above, in the second embodiment, the digital camera 100 performs processing to determine the type of subject by including the state of zoom, tilt, and so forth during image capture. This makes it possible to increase determination accuracy over that when the type of subject is determined from the image alone.

In this embodiment, a case was described in which the image processing apparatus of the present invention was applied to the digital camera 100, but this embodiment can also be applied to an apparatus having no image capture system, so long as it performs image processing. In this case, zoom and other such camera information is added to the image data ahead of time, and processing is performed by the image processing apparatus on the basis of this.

Also, in this embodiment an example was described in which the number (size) of block divisions of signal division involving control depending on the state of the zoom and focus was two types, but the number of divisions of blocks is not limited to two types. A configuration can be employed in which the size or number of divisions of blocks is controlled in multiple steps according to the characteristics of the zoom.

Third Embodiment

A third embodiment of the present invention will now be described through reference to FIG. 16. This third embodiment differs from the first embodiment in that the type of subject is determined by using characteristics about the movement over time of the subject and the digital camera 100. The configuration and basic operation of the digital camera 100 in the third embodiment are the same as those described for the first embodiment, and will therefore not be described in detail again (see FIGS. 1 and 2).

Figure 7:
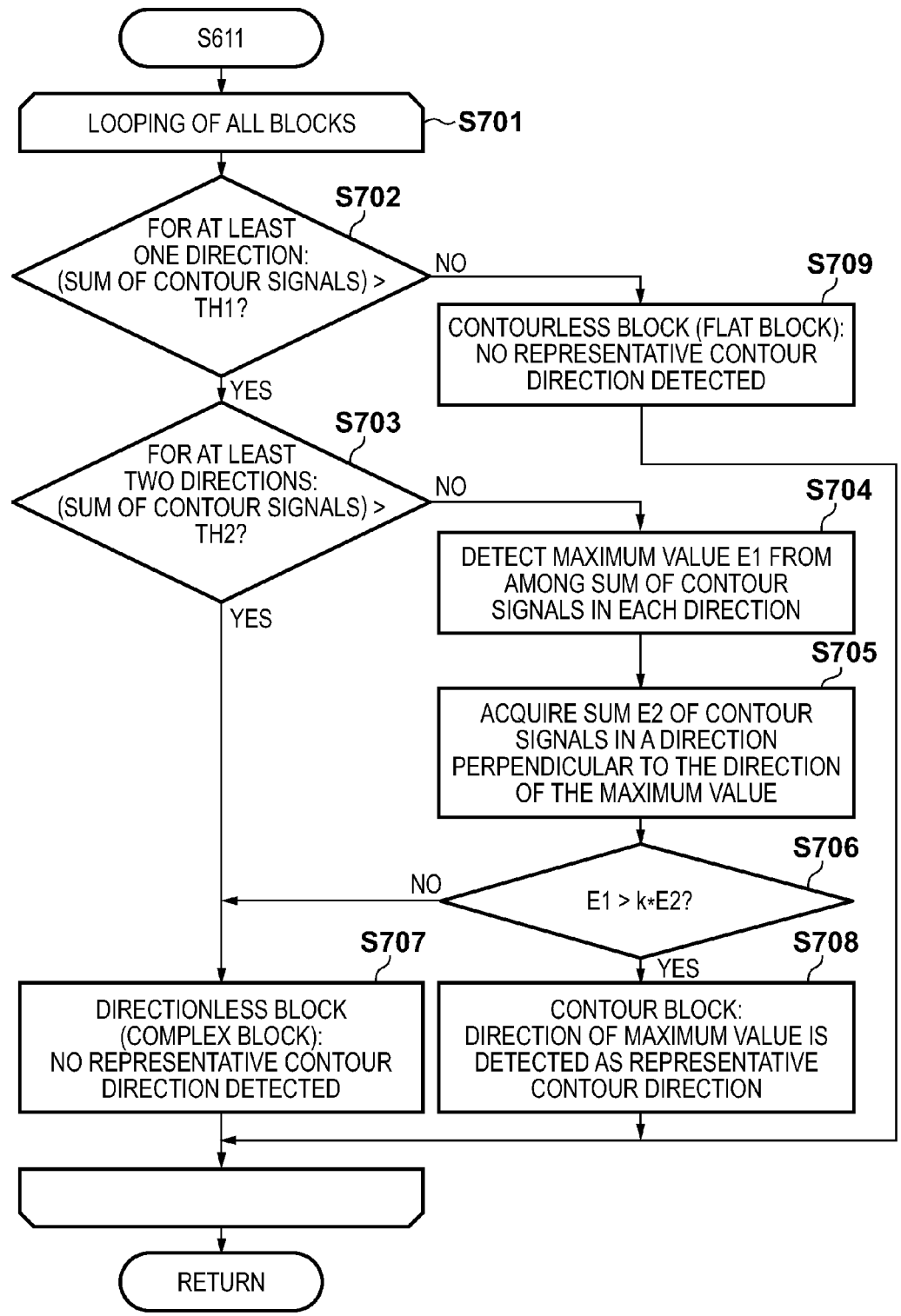
FIG. 7 is a flowchart of the details of the processing in step S611 in FIG. 6B.

In this third embodiment, the details of the processing in step S611 in FIG. 6B differ from those in the first embodiment, and the processing of FIG. 16 is executed instead of that in FIG. 7. In FIG. 16, those blocks in which the same processing is performed as in FIG. 7 are numbered the same, and will not be described again.

In step S1601, the system control unit 50 calculates a frame difference value in relation to the block being processed. More specifically, the system control unit 50 calculates pixel difference values for block images at the same position of an earlier image signal (second image data expressing a second image), which is stored in step S1605 described later, and calculates the sum of these pixel difference values within a group.

In step S1602, the system control unit 50 acquires the acceleration of the digital camera 100 from the output of the gyro acceleration sensor 125. The system control unit 50 determines that the digital camera 100 is moving if the acceleration is at or above a specific threshold TH3. If the digital camera 100 is determined to be moving the processing proceeds to step S702, and otherwise the processing proceeds to step S1603.

In step S1603, the system control unit 50 determines whether or not the sum of frame difference values calculated in step S1601 is greater than a threshold TH4. If the sum is greater than the threshold TH4, the processing proceeds to step S1604, and otherwise the processing proceeds to step S702.

In step S1604, the system control unit 50 determines that the block being processed is a non-building block. This is because a region that is moving even though the digital camera 100 is not moving is considered not to be a building. In other words, a moving region is considered to be a person region, or a region of a natural object such as a plant that is swaying in the wind. In this case no representative contour direction is detected.

In step S1605, the system control unit 50 records the image currently being processed to the image memory 106. This image is utilized in calculating the frame difference values in step S1601.

Block classification processing based on movement information (detection processing of representative contour direction) was described above. Processing other than this is the same as the processing described through reference to FIGS. 6A and 6B in the first embodiment, and therefore will not be described again.

In this embodiment, processing in which blocks for subject regions that are moving over time are not considered to be contour blocks is added to the first embodiment. This allows just the desired subject contour to be detected more accurately, so the type of subject is determined more accurately.

Also, in this embodiment a case of distinguishing between a building and a natural object was described as an example, but as long as the region used for discrimination is limited by movement of the subject, any kind of subject can be distinguished.

In this embodiment, subject movement information was utilized only in processing to determine the type of subject, but the parameters for image correction processing by the image processing unit 105 may be changed on the basis of movement. For instance, processing may be added so that if the subject is determined to be a natural object, the gain of contour enhancement processing is increased and the median frequency is lowered in moving regions as compared to stationary regions. This makes it possible to avoid enhancing a contour unnaturally by performing contour enhancement processing of the high-frequency component with respect to a subject for which high-frequency information has been lost due to movement.

Fourth Embodiment

A fourth embodiment of the present invention will be described through reference to FIG. 17 and FIGS. 18A to 18D. In this fourth embodiment, substantially the same image correction processing is performed as in the first embodiment, but the image correction processing includes the positional relation between a person and the subject. The configuration and basic operation of the digital camera 100 in the fourth embodiment are the same as those described for the first embodiment, and will therefore not be described in detail again (see FIGS. 1 and 2).

This fourth embodiment differs from the first embodiment in the details of the processing in step S603 of FIG. 6A, and instead the processing of FIG. 17 is executed. In step S1701, the system control unit 50 groups (labels) blocks and determines the type of subject in a group by the same processing as in steps S1201 to S1209 in FIG. 12.

In step S1702, the system control unit 50 detects a human face in the image. Any known method may be used for this facial detection processing. For example, pattern matching is performed with the feature amount for a face and the feature amount for a specified region in the image, and it is determined to be a face if the degree of matching is at or above a specific threshold.

In step S1703, the system control unit 50 determines whether or not a face was detected in step S1702. If a face was detected, the processing proceeds to step S1704, and otherwise the processing proceeds to step S1707.

In step S1704, the system control unit 50 determines whether or not the type of subject determined in step S602 (FIG. 6A) is a "building." If it is a "building," the processing proceeds to step S1705, and otherwise the processing proceeds to step S1707.

Figure 18A:
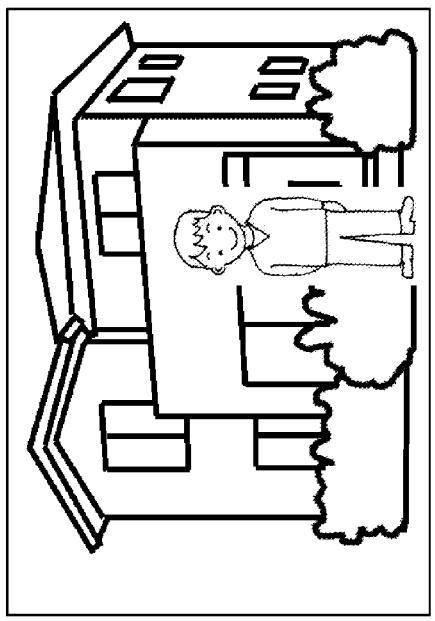
FIGS. 18A to 18D are concept diagrams of processing to determine whether or not there is a building in the background of a face in the fourth embodiment.
Figure 18B:
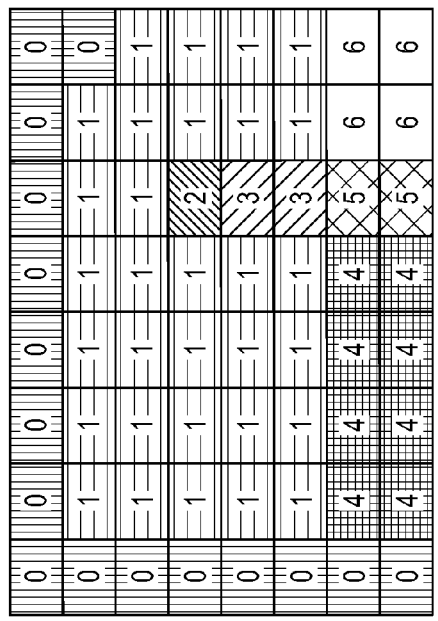
Figure 18C:
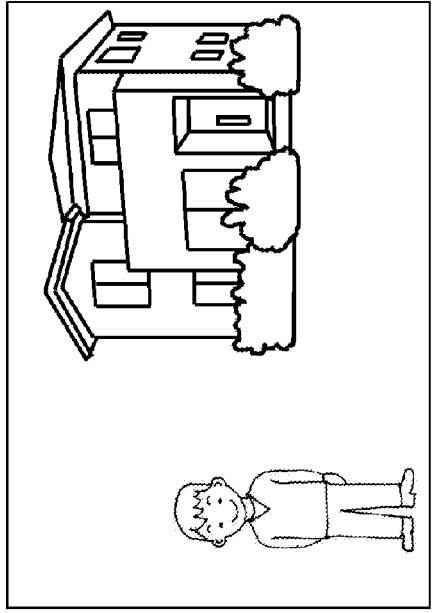
Figure 18D:
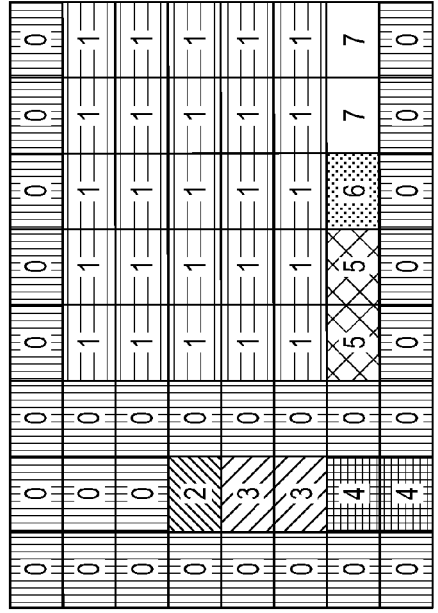

In step S1705, the system control unit 50 determines whether or not a building is present in the background of a detected face (background determination). This processing will be described through reference to FIGS. 18A to 18D. FIG. 18A shows a captured image, and FIG. 18B shows an example of labeling corresponding to FIG. 18A. Here, a flag for a building region (a flat building flag or complex building flag in step S1207 or S1208) is associated with the label "1" by labeling processing. The region of the label "2" is a region in which a face was detected in step S1702. In this step, the system control unit 50 determines whether or not a block including a label for a building region is adjacent to a block including a face region. In the example in FIG. 18B, a block with a label of "2" is adjacent to a block with a building label of "1," so a building is determined to be present in the background of a face. Meanwhile, FIG. 18C shows a captured image just as in FIG. 18A, and FIG. 18D shows an example of labeling corresponding to FIG. 18C. A label of "1" corresponds to a building region, and a label of "2" corresponds to a face region. In FIG. 18D, since no block with a label of "1" is adjacent to a block with a label of "2," it is determined that no building is present in the background of a face. If it is determined by this determination processing that a building is present in the background of a face, the processing proceeds to step S1706, and otherwise the processing proceeds to step S1707.

In step S1706, the image processing unit 105 executes image correction processing for a background building under the control of the system control unit 50. In image correction processing for a background building, basically the parameters according to the type of subject shown in FIG. 11A are used. However, the gain is set lower in the contour enhancement processing unit 206.

Meanwhile, in step S1707, the image processing unit 105 executes image correction processing with the parameters shown in FIG. 11A, just as in the first embodiment, under the control of the system control unit 50.

In this embodiment, the digital camera 100 changed the parameters for image correction processing depending on whether or not a face is detected and a building is included in the background of the face. Consequently, it is possible to prevent excessive enhancement of the contour of a background subject (in this case, a building) that would make enhance it more than a face.

Furthermore, in this embodiment an example was discussed in which only the gain in contour enhancement processing was changed as the image correction processing for a background building, but the parameters that are changed are not limited to this. For instance, the ε value of noise reduction processing may be increased if a building is present in the background of a face, or any other parameter may be changed.

In addition to the control discussed above, it is also possible to have a configuration in which camera information is used to change a parameter. For example, when the lens group 101 is set to a state that will blur the background (open aperture, etc.), processing may be performed to switch off contour enhancement processing other than for a face, and strengthen noise reduction. This makes it possible to avoid enhancing the contour even though the background is blurred, which would produce an unnatural image. Also, a building was used as an example in this embodiment, but the present invention can be similarly applied when the subject is any manmade object having contour features similar to those of a building, such as a table or other furniture.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262657, filed on Nov. 30, 2011, which is hereby incorporated by reference herein in its entirety.

What is claimed is:

1. An image processing apparatus, comprising:
an acquisition unit configured to acquire image data expressing an image including a specific subject;
a production unit configured to produce a contour signal expressing a contour portion included in the image;
a detection unit configured to detect, on the basis of the contour signal, a representative contour direction for each of a plurality of division regions obtained by dividing up the image, the detection unit detecting a specific direction as the representative contour direction when the direction of the entire contour portion included in the division regions is biased in the specific direction by at least a specific degree;
a determination unit configured to determine a type of the subject on the basis of at least one of the following: a number of the division regions for each representative contour direction, a number of the division regions in which a representative contour direction of a predetermined direction was detected and which are continuously aligned in a direction perpendicular to the predetermined direction in the image, and a number of representative contour directions detected; and
a correction unit configured to correct the image data according to a correction method corresponding to the type of the subject.

2. The image processing apparatus according to claim 1, wherein, when the type of the subject is determined to be a building, the determination unit:
classifies the plurality of division regions into a plurality of groups so that there is at least a specific similarity between division regions in a group, and
determines, for each of the plurality of groups, the type of the subject in the group on the basis of a number of division regions in the group, a proportion of division regions in which either a horizontal or vertical representative contour direction was detected with respect to all of the division regions in the group in which the representative contour direction was detected, and a proportion of division regions in which the contour signal was no more than a specific amount with respect to all of the division regions in the group, and
the correction unit corrects each of the division regions in the group based on the type of the subject in the group, for each of the plurality of groups.

3. The image processing apparatus according to claim 1, wherein,
the acquisition unit is configured to further acquire zoom information of an image capturing apparatus which has captured said image, the zoom information being zoom information at a time of the capture of said image, and
the detection unit is configured to increase a size of each of the plurality of division regions the larger is zoom magnification indicated by the zoom information, and to decrease the size of each of the plurality of division regions the smaller is the zoom magnification indicated by the zoom information.

4. The image processing apparatus according to claim 3, wherein, the acquisition unit is configured to further acquire focus information of the image capturing apparatus which has captured said image, the focus information being focus information at a time of the capture of said image, and the detection unit is configured to set the size of each of the plurality of division regions to at least a specific size regardless of the zoom magnification when focal distance indicated by the focus information is shorter than a specific threshold.

5. The image processing apparatus according to claim 1, wherein, the acquisition unit is configured to further acquire tilt information of an image capturing apparatus which has captured said image, the tilt information being tilt information at a time of the capture of said image, the detection unit is configured to correct the detected representative contour direction according to tilt indicated by the tilt information, and the determination unit is configured to correct the perpendicular direction according to the tilt indicated by the tilt information.

6. The image processing apparatus according to claim 1, wherein, the acquisition unit is configured to further acquire second image data expressing a second image captured earlier than the image including the specific subject, and the detection unit is configured not to detect the representative contour direction for the division regions of the image in which a difference from corresponding division regions in the second image is above a threshold.

7. The image processing apparatus according to claim 1, further comprising:

a face detection unit configured to detect a face included in the image; and a background determination unit configured to determine whether or not a manmade object exists in a background of the detected face, wherein the correction unit is configured to correct the image data according to different correction methods when there is and there is not a manmade object in the background of the detected face.

8. The image processing apparatus according to claim 1, wherein the correction by the correction unit includes contour enhancement and/or noise reduction.

9. A method for controlling an image processing apparatus, comprising:

an acquisition step of acquiring, by an acquisition unit, image data expressing an image including a specific subject;

a production step of producing, by a production unit, a contour signal expressing a contour portion included in the image;

a detection step of detecting, by a detection unit, on the basis of the contour signal, a representative contour direction for each of a plurality of division regions obtained by dividing up the image, wherein a specific direction is detected as the representative contour direction when the direction of the entire contour portion included in the division regions is biased in the specific direction by at least a specific degree;

a determination step of determining, by a determination unit, a type of the subject on the basis of at least one of the following: a number of the division regions for each representative contour direction, a number of the division regions in which a representative contour direction of a predetermined direction was detected and which are continuously aligned in a direction perpendicular to the predetermined direction in the image, and a number of representative contour directions detected; and a correction step of correcting, by a correction unit, the image data according to a correction method corresponding to the type of the subject.

10. A non-transitory computer-readable storage medium which stores a program for causing a computer to execute the method according to claim 9.

* * * * *